US009408253B2

(12) United States Patent
Gorsuch

(10) Patent No.: US 9,408,253 B2
(45) Date of Patent: *Aug. 2, 2016

(54) SUBSCRIBER UNIT FOR MANAGING DUAL WIRELESS COMMUNICATION LINKS

(71) Applicant: IPR LICENSING, INC., Wilmington, DE (US)

(72) Inventor: Thomas E. Gorsuch, Merritt Island, FL (US)

(73) Assignee: IPR LICENSING, INC., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 14/599,028

(22) Filed: Jan. 16, 2015

(65) Prior Publication Data

US 2015/0133187 A1    May 14, 2015

Related U.S. Application Data

(63) Continuation of application No. 13/753,149, filed on Jan. 29, 2013, which is a continuation of application No. 12/615,098, filed on Nov. 9, 2009, now Pat. No. 8,380,244, which is a continuation of application No.

(Continued)

(51) Int. Cl.
*H04W 88/06* (2009.01)
*H04W 48/18* (2009.01)
(Continued)

(52) U.S. Cl.
CPC ............. *H04W 88/06* (2013.01); *H04W 48/18* (2013.01); *H04W 72/02* (2013.01); *H04W 84/12* (2013.01)

(58) Field of Classification Search
CPC ...... H04W 88/06; H04W 48/18; H04W 72/02
USPC ............................................ 455/553.1, 552.1
See application file for complete search history.

(56) References Cited

U.S. PATENT DOCUMENTS 4,107,469 A   8/1978   Jenkins
4,577,316 A   3/1986   Schiff
(Continued)

FOREIGN PATENT DOCUMENTS

CA   2064646   3/1992
CA   2306485   4/1999
(Continued)

OTHER PUBLICATIONS

U.S. Appl. No. 60/000,775, filed Jun. 1995, Lomp et al.
(Continued)

*Primary Examiner* — Barry Taylor
(74) *Attorney, Agent, or Firm* — Volpe and Koenig, P.C.

(57) ABSTRACT

A technique for communication with a local area network (LAN) via a wireless connection determines whether a first short-range, high-speed, wireless communication path is available and connects to the LAN using a longer range, lower speed wireless communication path if the short-range, high-speed wireless communication path is not available. The low-range, high-speed wireless communication path is a wireless communication path is a wireless LAN connection such as an IEE 802.11-compliant wireless LAN and the long-range, low-sped wireless communication mode is a cellular CDMA-type connection. Determining whether the first IEEE 802.11 mode is available can be done by detecting a beacon signal, or transmitting a probe request message and detecting a probe response message in response to the probe request, indicating the presence or availability of the short-range, high-speed wireless communication path. Alternatively, the availability of short-range, high-speed wireless communication path can be detected by simply detecting activity on it.

34 Claims, 6 Drawing Sheets

Related U.S. Application Data

11/326,809, filed on Jan. 6, 2006, now Pat. No. 7,616,970, which is a continuation of application No. 10/358,082, filed on Feb. 3, 2003, now Pat. No. 7,013,162, and a continuation of application No. 10/341,528, filed on Jan. 13, 2003, now Pat. No. 7,024,222, said application No. 10/358,082 is a continuation of application No. 09/400,136, filed on Sep. 21, 1999, now Pat. No. 6,526,034, said application No. 10/341,528 is a continuation of application No. 09/400,136, filed on Sep. 21, 1999, now Pat. No. 6,526,034.

(51) Int. Cl.
  H04W 72/02 (2009.01)
  H04W 84/12 (2009.01)

(56) References Cited

U.S. PATENT DOCUMENTS

| | | |
|---|---|---|
| 4,625,308 A | 11/1986 | Kim et al. |
| 4,675,863 A | 6/1987 | Paneth et al. |
| 4,817,089 A | 3/1989 | Paneth et al. |
| 4,841,526 A | 6/1989 | Wilson et al. |
| 4,862,453 A | 8/1989 | West et al. |
| 4,866,709 A | 9/1989 | West et al. |
| 4,912,705 A | 3/1990 | Paneth et al. |
| 4,949,395 A | 8/1990 | Rydbeck |
| 4,989,230 A | 1/1991 | Gillig et al. |
| 5,020,092 A | 5/1991 | Phillips et al. |
| 5,020,093 A | 5/1991 | Pireh |
| 5,022,024 A | 6/1991 | Paneth et al. |
| 5,027,348 A | 6/1991 | Curry |
| 5,027,400 A | 6/1991 | Baji et al. |
| 5,114,375 A | 5/1992 | Wellhausen et al. |
| 5,115,309 A | 5/1992 | Hang |
| 5,226,044 A | 7/1993 | Gupta et al. |
| 5,228,074 A | 7/1993 | Mizikovsky |
| 5,257,257 A | 10/1993 | Chen et al. |
| 5,260,998 A | 11/1993 | Takagi |
| 5,268,900 A | 12/1993 | Hluchyj et al. |
| 5,280,476 A | 1/1994 | Kojima et al. |
| 5,282,222 A | 1/1994 | Fattouche et al. |
| 5,319,641 A | 6/1994 | Fridrich et al. |
| 5,325,419 A | 6/1994 | Connolly et al. |
| 5,355,374 A | 10/1994 | Hester et al. |
| 5,369,637 A | 11/1994 | Richardson et al. |
| 5,373,502 A | 12/1994 | Turban |
| 5,375,124 A | 12/1994 | D'Ambrogio et al. |
| 5,388,102 A | 2/1995 | Griffith et al. |
| 5,394,473 A | 2/1995 | Davidson |
| 5,406,643 A | 4/1995 | Burke et al. |
| 5,412,429 A | 5/1995 | Glover |
| 5,442,625 A | 8/1995 | Gitlin et al. |
| 5,444,702 A | 8/1995 | Burnett et al. |
| 5,446,736 A | 8/1995 | Gleeson et al. |
| 5,463,629 A | 10/1995 | Ko |
| 5,471,463 A | 11/1995 | Hulbert |
| 5,504,803 A | 4/1996 | Yamada et al. |
| 5,508,998 A | 4/1996 | Sha et al. |
| 5,535,432 A | 7/1996 | Dent |
| 5,553,069 A | 9/1996 | Ueno et al. |
| 5,553,099 A | 9/1996 | Carroll et al. |
| 5,568,476 A | 10/1996 | Sherer et al. |
| 5,572,528 A | 11/1996 | Shuen |
| 5,577,033 A | 11/1996 | Chang et al. |
| 5,585,850 A | 12/1996 | Schwaller |
| 5,586,113 A | 12/1996 | Adachi et al. |
| 5,590,156 A | 12/1996 | Carney |
| 5,592,470 A | 1/1997 | Rudrapatna et al. |
| 5,592,471 A | 1/1997 | Briskman |
| 5,592,491 A | 1/1997 | Dinkins |
| 5,594,718 A | 1/1997 | Weaver, Jr. et al. |
| 5,594,782 A | 1/1997 | Zicker et al. |
| 5,598,458 A | 1/1997 | Bales et al. |
| 5,602,827 A | 2/1997 | Lindeborg et al. |
| 5,603,081 A | 2/1997 | Raith et al. |
| 5,606,580 A | 2/1997 | Mourot et al. |
| 5,613,204 A | 3/1997 | Haberman et al. |
| 5,615,213 A | 3/1997 | Griefer |
| 5,617,423 A | 4/1997 | Li et al. |
| 5,627,829 A | 5/1997 | Gleeson et al. |
| 5,630,061 A | 5/1997 | Richter et al. |
| 5,636,140 A | 6/1997 | Lee et al. |
| 5,642,348 A | 6/1997 | Barzegar et al. |
| 5,655,001 A | 8/1997 | Cline et al. |
| 5,657,317 A | 8/1997 | Mahany et al. |
| 5,657,358 A | 8/1997 | Panech et al. |
| 5,663,958 A | 9/1997 | Ward |
| 5,663,990 A | 9/1997 | Bolgiano et al. |
| 5,671,218 A | 9/1997 | I et al. |
| 5,673,259 A | 9/1997 | Quick, Jr. |
| 5,687,194 A | 11/1997 | Paneth et al. |
| 5,696,903 A | 12/1997 | Mahany |
| 5,697,059 A | 12/1997 | Carney |
| 5,699,364 A | 12/1997 | Sato et al. |
| 5,708,656 A | 1/1998 | Noneman et al. |
| 5,715,296 A | 2/1998 | Schornack et al. |
| 5,719,859 A | 2/1998 | Kobayashi et al. |
| 5,734,646 A | 3/1998 | I et al. |
| 5,737,706 A | 4/1998 | Seazholtz et al. |
| 5,748,619 A | 5/1998 | Meier |
| 5,751,702 A | 5/1998 | Evans et al. |
| 5,768,695 A | 6/1998 | Fischer et al. |
| 5,771,353 A | 6/1998 | Eggleston et al. |
| 5,774,460 A | 6/1998 | Schiffel et al. |
| 5,774,461 A | 6/1998 | Hyden et al. |
| 5,781,542 A | 7/1998 | Tanaka et al. |
| 5,784,406 A | 7/1998 | DeJaco et al. |
| 5,787,080 A | 7/1998 | Hulyalkar et al. |
| 5,790,551 A | 8/1998 | Chan |
| 5,793,744 A | 8/1998 | Kanerva et al. |
| 5,796,727 A | 8/1998 | Harrison et al. |
| 5,796,744 A | 8/1998 | Krawczak et al. |
| 5,802,465 A | 9/1998 | Hamalainen et al. |
| 5,802,469 A | 9/1998 | Nounin et al. |
| 5,809,415 A | 9/1998 | Rossmann |
| 5,812,637 A | 9/1998 | Schornack et al. |
| 5,815,811 A | 9/1998 | Pinard et al. |
| 5,818,852 A * | 10/1998 | Kapoor .............. H04L 1/1803 714/749 |
| 5,825,807 A | 10/1998 | Kumar |
| 5,828,659 A | 10/1998 | Teder et al. |
| 5,828,662 A | 10/1998 | Jalali et al. |
| 5,832,378 A | 11/1998 | Zicker et al. |
| 5,842,122 A | 11/1998 | Schellinger et al. |
| 5,844,894 A | 12/1998 | Dent |
| 5,845,211 A | 12/1998 | Roach, Jr. |
| 5,852,721 A | 12/1998 | Dillon et al. |
| 5,854,786 A | 12/1998 | Henderson et al. |
| 5,854,985 A | 12/1998 | Sainton et al. |
| 5,856,971 A | 1/1999 | Gitlin et al. |
| 5,859,840 A | 1/1999 | Tiedemann, Jr. et al. |
| 5,859,879 A | 1/1999 | Bolgiano et al. |
| 5,872,786 A | 2/1999 | Shobatake |
| 5,873,033 A | 2/1999 | Hjern et al. |
| 5,873,037 A | 2/1999 | Zicker et al. |
| 5,875,186 A | 2/1999 | Belanger et al. |
| 5,878,344 A | 3/1999 | Zicker |
| 5,881,060 A | 3/1999 | Morrow et al. |
| 5,884,189 A | 3/1999 | Yamazaki et al. |
| 5,887,259 A | 3/1999 | Zicker et al. |
| 5,892,924 A | 4/1999 | Lyon et al. |
| 5,896,376 A | 4/1999 | Alperovich et al. |
| 5,903,548 A | 5/1999 | Delamater |
| 5,907,544 A | 5/1999 | Rypinski |
| 5,910,945 A | 6/1999 | Garrison et al. |
| 5,912,891 A | 6/1999 | Kanai |
| 5,914,950 A * | 6/1999 | Tiedemann, Jr. ....... H04L 47/10 370/335 |
| 5,923,650 A | 7/1999 | Chen et al. |
| 5,930,230 A | 7/1999 | Odenwalder et al. |
| 5,935,245 A | 8/1999 | Sherer |
| 5,946,616 A | 8/1999 | Schornack et al. |

(56) References Cited

U.S. PATENT DOCUMENTS

| | | |
|---|---|---|
| 5,950,131 A | 9/1999 | Vilmur |
| 5,956,331 A | 9/1999 | Rautiola et al. |
| 5,956,332 A | 9/1999 | Rasanen et al. |
| 5,966,374 A | 10/1999 | Rasanen |
| 5,966,658 A | 10/1999 | Kennedy et al. |
| 5,991,279 A | 11/1999 | Haugli et al. |
| 5,999,708 A | 12/1999 | Kajita |
| 6,001,800 A | 12/1999 | Mehta et al. |
| 6,002,690 A | 12/1999 | Takayama et al. |
| 6,002,918 A | 12/1999 | Heiman et al. |
| 6,005,855 A | 12/1999 | Zehavi et al. |
| 6,006,105 A | 12/1999 | Rostoker et al. |
| 6,009,106 A | 12/1999 | Rustad et al. |
| 6,011,800 A | 1/2000 | Nadgauda et al. |
| 6,011,978 A | 1/2000 | Ault et al. |
| 6,028,853 A | 2/2000 | Haartsen |
| 6,028,868 A | 2/2000 | Yeung et al. |
| 6,052,385 A | 4/2000 | Kanerva et al. |
| 6,052,589 A | 4/2000 | Persson et al. |
| 6,058,104 A | 5/2000 | Snelling et al. |
| 6,061,356 A | 5/2000 | Terry |
| 6,064,678 A | 5/2000 | Sindhushayana et al. |
| 6,067,290 A | 5/2000 | Paulraj et al. |
| 6,069,883 A | 5/2000 | Ejzak et al. |
| 6,078,572 A | 6/2000 | Tanno et al. |
| 6,081,518 A | 6/2000 | Bowman-Amuah |
| 6,081,536 A | 6/2000 | Gorsuch et al. |
| 6,084,866 A | 7/2000 | Dorenbosch et al. |
| 6,084,867 A | 7/2000 | Meier |
| 6,088,335 A | 7/2000 | I et al. |
| 6,097,733 A | 8/2000 | Basu et al. |
| 6,111,863 A | 8/2000 | Rostoker et al. |
| 6,112,092 A | 8/2000 | Benveniste |
| 6,115,615 A | 9/2000 | Ota et al. |
| 6,134,233 A | 10/2000 | Kay |
| 6,137,802 A | 10/2000 | Jones et al. |
| 6,138,010 A | 10/2000 | Rabe et al. |
| 6,151,332 A | 11/2000 | Gorsuch et al. |
| 6,151,510 A | 11/2000 | Zicker |
| 6,157,619 A | 12/2000 | Ozluturk et al. |
| 6,161,013 A | 12/2000 | Anderson et al. |
| 6,161,123 A | 12/2000 | Renouard et al. |
| 6,163,692 A | 12/2000 | Chakrabarti et al. |
| 6,167,279 A | 12/2000 | Chang et al. |
| 6,178,181 B1 | 1/2001 | Glitho |
| 6,188,691 B1 | 2/2001 | Barkai et al. |
| 6,195,355 B1 | 2/2001 | Demizu |
| 6,195,362 B1 | 2/2001 | Darcie et al. |
| 6,195,697 B1 | 2/2001 | Bowman-Amuah |
| 6,196,362 B1 | 3/2001 | Daugherty, Jr. et al. |
| 6,198,723 B1 | 3/2001 | Parruck et al. |
| 6,198,941 B1 | 3/2001 | Aho et al. |
| 6,208,871 B1 | 3/2001 | Hall et al. |
| 6,215,798 B1 | 4/2001 | Carneheim et al. |
| 6,222,828 B1 | 4/2001 | Ohlson et al. |
| 6,222,852 B1 | 4/2001 | Gandy |
| 6,226,267 B1 | 5/2001 | Spinney et al. |
| 6,236,642 B1 | 5/2001 | Shaffer et al. |
| 6,236,647 B1 * | 5/2001 | Amalfitano ............ H04L 1/0007 370/230 |
| 6,243,372 B1 | 6/2001 | Petch et al. |
| 6,243,579 B1 | 6/2001 | Kari |
| 6,243,581 B1 * | 6/2001 | Jawanda ............... H04W 36/12 370/338 |
| 6,249,681 B1 | 6/2001 | Virtanen |
| 6,259,683 B1 | 7/2001 | Sekine et al. |
| 6,262,980 B1 | 7/2001 | Leung et al. |
| 6,269,088 B1 | 7/2001 | Masui et al. |
| 6,269,402 B1 | 7/2001 | Lin et al. |
| 6,269,404 B1 | 7/2001 | Hart et al. |
| 6,272,168 B1 | 8/2001 | Lomp et al. |
| 6,285,665 B1 | 9/2001 | Chuah |
| 6,295,456 B1 | 9/2001 | Baker et al. |
| 6,307,840 B1 | 10/2001 | Wheatley, III et al. |
| 6,310,859 B1 | 10/2001 | Morita et al. |
| 6,320,857 B1 | 11/2001 | Tonnby et al. |
| 6,334,062 B1 | 12/2001 | Cashman |
| 6,335,922 B1 | 1/2002 | Tiedemann et al. |
| 6,336,129 B1 | 1/2002 | Ise et al. |
| 6,339,585 B1 | 1/2002 | Hulyalkar et al. |
| 6,359,896 B1 | 3/2002 | Baker et al. |
| 6,366,570 B1 | 4/2002 | Bhagalia |
| 6,370,117 B1 | 4/2002 | Koraitim et al. |
| 6,373,830 B1 | 4/2002 | Ozluturk |
| 6,373,834 B1 | 4/2002 | Lundh et al. |
| 6,377,548 B1 | 4/2002 | Chuah |
| 6,377,809 B1 | 4/2002 | Rezaiifar et al. |
| 6,388,999 B1 | 5/2002 | Gorsuch et al. |
| 6,389,000 B1 | 5/2002 | Jou |
| 6,396,804 B2 | 5/2002 | Odenwalder |
| 6,400,712 B1 | 6/2002 | Phillips |
| 6,400,722 B1 | 6/2002 | Chuah et al. |
| 6,400,946 B1 | 6/2002 | Vazvan et al. |
| 6,415,158 B1 | 7/2002 | King et al. |
| 6,418,148 B1 | 7/2002 | Kumar et al. |
| 6,418,324 B1 | 7/2002 | Doviak et al. |
| 6,424,834 B1 | 7/2002 | Chang et al. |
| 6,426,943 B1 | 7/2002 | Spinney et al. |
| 6,426,948 B1 | 7/2002 | Bowman-Amuah |
| 6,427,071 B1 | 7/2002 | Adams et al. |
| 6,445,777 B1 | 9/2002 | Clark |
| 6,449,588 B1 | 9/2002 | Bowman-Amuah |
| 6,456,608 B1 | 9/2002 | Lomp |
| 6,463,055 B1 | 10/2002 | Lupien et al. |
| 6,469,991 B1 | 10/2002 | Chuah |
| 6,473,097 B1 | 10/2002 | Elliott |
| 6,473,623 B1 | 10/2002 | Benveniste |
| 6,477,156 B1 | 11/2002 | Ala-Laurila et al. |
| 6,483,826 B1 * | 11/2002 | Åkerberg ............... H04W 48/12 370/335 |
| 6,484,211 B2 | 11/2002 | Turunen |
| 6,496,531 B1 | 12/2002 | Kamel et al. |
| 6,496,690 B1 | 12/2002 | Cobo et al. |
| 6,504,830 B1 | 1/2003 | Östberg et al. |
| 6,510,146 B1 | 1/2003 | Korpela et al. |
| 6,512,754 B2 | 1/2003 | Feder et al. |
| 6,519,651 B1 | 2/2003 | Dillon |
| 6,526,034 B1 | 2/2003 | Gorsuch |
| 6,526,039 B1 | 2/2003 | Dahlman et al. |
| 6,526,064 B1 | 2/2003 | Bousquet |
| 6,526,277 B1 | 2/2003 | Zicker et al. |
| 6,526,281 B1 | 2/2003 | Gorsuch et al. |
| 6,532,365 B1 | 3/2003 | Anderson et al. |
| 6,542,481 B2 | 4/2003 | Foore et al. |
| 6,542,935 B1 | 4/2003 | Ishii |
| 6,545,986 B1 | 4/2003 | Stellakis |
| 6,546,425 B1 | 4/2003 | Hanson et al. |
| 6,553,032 B1 | 4/2003 | Farley et al. |
| 6,556,659 B1 | 4/2003 | Bowman-Amuah |
| 6,560,443 B1 | 5/2003 | Vaisanen et al. |
| 6,567,416 B1 | 5/2003 | Chuah |
| 6,570,865 B2 | 5/2003 | Masui et al. |
| 6,571,296 B1 | 5/2003 | Dillon |
| 6,574,211 B2 | 6/2003 | Padovani et al. |
| 6,574,239 B1 | 6/2003 | Dowling et al. |
| 6,574,473 B2 | 6/2003 | Rinne et al. |
| 6,577,628 B1 | 6/2003 | Hejza |
| 6,577,643 B1 | 6/2003 | Rai et al. |
| 6,580,700 B1 | 6/2003 | Pinard et al. |
| 6,590,928 B1 | 7/2003 | Haartsen |
| 6,597,913 B2 | 7/2003 | Natarajan |
| 6,600,734 B1 | 7/2003 | Gemert et al. |
| 6,608,832 B2 | 8/2003 | Forslöw |
| 6,628,671 B1 | 9/2003 | Dynarski et al. |
| 6,640,248 B1 | 10/2003 | Jorgensen |
| 6,671,510 B1 | 12/2003 | Kelly et al. |
| 6,680,922 B1 | 1/2004 | Jorgensen |
| 6,681,259 B1 | 1/2004 | Lemilainen et al. |
| 6,697,638 B1 | 2/2004 | Larsson et al. |
| 6,701,361 B1 | 3/2004 | Meier |
| 6,704,303 B1 | 3/2004 | Bowman-Amuah |
| 6,711,146 B2 | 3/2004 | Yegoshin |
| 6,714,983 B1 | 3/2004 | Koenck et al. |
| 6,714,987 B1 | 3/2004 | Amin et al. |

(56) References Cited

U.S. PATENT DOCUMENTS

| | | |
|---|---|---|
| 6,717,926 B1 | 4/2004 | Deboille et al. |
| 6,717,928 B1 | 4/2004 | Kalliokulju et al. |
| 6,725,047 B1 | 4/2004 | Farley et al. |
| 6,725,058 B2 | 4/2004 | Rinne et al. |
| 6,732,174 B1 | 5/2004 | Gundecha et al. |
| 6,735,217 B1 | 5/2004 | Webber, Jr. et al. |
| 6,738,981 B1 | 5/2004 | Tönnby et al. |
| 6,751,459 B1 | 6/2004 | Lee et al. |
| 6,757,268 B1 | 6/2004 | Zendle |
| 6,757,270 B1 | 6/2004 | Kumar et al. |
| 6,845,104 B2 | 1/2005 | Johnson et al. |
| 6,850,512 B1 | 2/2005 | Bishop et al. |
| 6,853,851 B1 | 2/2005 | Rautiola et al. |
| 6,862,622 B2 | 3/2005 | Jorgensen |
| 6,937,566 B1 | 8/2005 | Forslöw |
| 6,947,400 B2 | 9/2005 | Heller |
| 6,947,408 B1 | 9/2005 | Liberti et al. |
| 6,956,826 B1 | 10/2005 | Binder |
| 6,956,840 B1 | 10/2005 | Proctor, Jr. |
| 6,965,778 B1 | 11/2005 | Ferguson et al. |
| 6,973,140 B2 | 12/2005 | Hoffman et al. |
| 6,985,446 B1 | 1/2006 | Hurtta et al. |
| 6,999,438 B2 | 2/2006 | Nounin et al. |
| 7,013,162 B2 | 3/2006 | Gorsuch |
| 7,016,675 B1 | 3/2006 | Schuster et al. |
| 7,023,825 B1 | 4/2006 | Haumont et al. |
| 7,039,031 B1 | 5/2006 | Joeressen |
| 7,046,646 B2 | 5/2006 | Kilgore |
| 7,054,296 B1 | 5/2006 | Sorrells et al. |
| 7,089,034 B1 | 8/2006 | Schornack et al. |
| 7,502,406 B2 | 3/2009 | Lomp et al. |
| 7,502,626 B1 * | 3/2009 | Lemilainen ........... H04M 1/725 370/351 |
| 7,545,774 B1 | 6/2009 | Rimpela et al. |
| 7,558,557 B1 | 7/2009 | Gollnick et al. |
| 7,580,715 B2 | 8/2009 | Gorsuch et al. |
| 7,583,971 B2 | 9/2009 | Gorsuch et al. |
| 7,606,243 B2 | 10/2009 | Takabatake et al. |
| 7,778,641 B1 | 8/2010 | Willars et al. |
| 7,849,475 B2 | 12/2010 | Covell et al. |
| 7,894,475 B2 | 2/2011 | Bishop et al. |
| 2002/0051434 A1 | 5/2002 | Ozluturk et al. |
| 2002/0191562 A1 | 12/2002 | Kumaki et al. |
| 2003/0039237 A1 | 2/2003 | Forslöw |
| 2004/0018854 A1 | 1/2004 | Gorsuch |
| 2004/0029606 A1 | 2/2004 | Tiedemann et al. |
| 2004/0029612 A1 | 2/2004 | Gorsuch |
| 2004/0160910 A1 | 8/2004 | Gorsuch et al. |
| 2004/0180696 A1 | 9/2004 | Foore et al. |
| 2005/0286476 A1 | 12/2005 | Crosswy et al. |
| 2008/0274767 A1 * | 11/2008 | Sainton .................. H04L 12/14 455/552.1 |
| 2009/0073898 A1 | 3/2009 | Lim |
| 2009/0310588 A1 * | 12/2009 | Padovani ............... H04B 7/264 370/342 |
| 2010/0046436 A1 | 2/2010 | Doviak et al. |

FOREIGN PATENT DOCUMENTS

| | | |
|---|---|---|
| DE | 9108309 | 10/1991 |
| DE | 4118992 | 12/1992 |
| DE | 4118993 | 12/1992 |
| DE | 4426183 | 10/1995 |
| DE | 19907085 | 4/2000 |
| EP | 0 443 061 | 8/1991 |
| EP | 0 526 106 | 2/1993 |
| EP | 0 591 465 | 4/1994 |
| EP | 0 622 924 | 11/1994 |
| EP | 0 635 949 | 1/1995 |
| EP | 0 682 423 | 11/1995 |
| EP | 0 682 426 | 11/1995 |
| EP | 0 700 167 | 3/1996 |
| EP | 0 719 062 | 6/1996 |
| EP | 0 719 064 | 6/1996 |
| EP | 0 742 991 | 11/1996 |
| EP | 0 889 661 | 1/1999 |
| EP | 0 934 635 | 8/1999 |
| EP | 0 936 777 | 8/1999 |
| EP | 0 990 365 | 5/2000 |
| EP | 1 026 908 | 8/2000 |
| EP | 1 064 805 | 1/2001 |
| EP | 1 155 579 | 11/2001 |
| EP | 1 699 251 | 9/2006 |
| FR | 2761557 | 1/1998 |
| GB | 2243973 | 11/1991 |
| JP | 05-167609 | 7/1993 |
| JP | 08-097824 | 4/1996 |
| JP | 08-140143 | 5/1996 |
| JP | 08-275237 | 10/1996 |
| JP | 08-316966 | 11/1996 |
| JP | 09-55764 | 2/1997 |
| JP | 10-041970 | 2/1998 |
| JP | 10-117207 | 5/1998 |
| JP | 10-164644 | 6/1998 |
| JP | 10-285203 | 10/1998 |
| JP | 11-088331 | 3/1999 |
| JP | 11-103331 | 4/1999 |
| JP | 11-163967 | 6/1999 |
| JP | 11-205857 | 7/1999 |
| JP | 11-220776 | 8/1999 |
| JP | 2000-236343 | 8/2000 |
| JP | 2000-286851 | 10/2000 |
| JP | 2002-51044 | 4/2002 |
| KR | 1998-077980 | 11/1998 |
| KR | 10-0187823 | 1/1999 |
| KR | 1999-0058020 | 7/1999 |
| RU | 1837403 | 8/1993 |
| SU | 1401626 | 6/1988 |
| WO | 93/16560 | 8/1993 |
| WO | 93/21719 | 10/1993 |
| WO | 95/07578 | 3/1995 |
| WO | 95/08900 | 3/1995 |
| WO | 95/23488 | 8/1995 |
| WO | 95/30289 | 12/1995 |
| WO | 96/08934 | 3/1996 |
| WO | 96/37081 | 11/1996 |
| WO | 96/27994 | 12/1996 |
| WO | 97/32412 | 4/1997 |
| WO | 97/23073 | 6/1997 |
| WO | 97/36405 | 10/1997 |
| WO | 97/46044 | 12/1997 |
| WO | 97/47125 | 12/1997 |
| WO | 98/30045 | 7/1998 |
| WO | 98/32295 | 10/1998 |
| WO | 98/30042 | 11/1998 |
| WO | 98/58511 | 12/1998 |
| WO | 98/58512 | 12/1998 |
| WO | 98/59447 | 12/1998 |
| WO | 98/59523 | 12/1998 |
| WO | 99/29126 | 6/1999 |
| WO | 99/38083 | 7/1999 |
| WO | 99/39488 | 8/1999 |
| WO | 99/44341 | 9/1999 |
| WO | 99/48312 | 9/1999 |
| WO | 99/63713 | 12/1999 |
| WO | 99/63776 | 12/1999 |

OTHER PUBLICATIONS

U.S. Appl. No. 60/008,320, filed Dec. 1995, Link.
U.S. Appl. No. 60/050,277, filed Jun. 1997, Gorsuch et al.
U.S. Appl. No. 60/050,338, filed Jun. 1997, Gorsuch et al.
U.S. Appl. No. 60/061,790, filed Oct. 1997, Chuah.
U.S. Appl. No. 60/077,741, filed Mar. 1998, Chuah.
Andermo et al., "Code Division Testbed, CODIT," IEEE International Conference on Universal Personal Communications, vol. 1, pp. 397-401 (Oct. 12-15, 1993).
Andermo et al., "CODIT and Third Generation Systems," 4$^{th}$ IEEE International Conference on Universal Personal Communications Record, pp. 843-847 (Nov. 6-10, 1995).
Andermo et al., "CODIT, a Testbed Project Evaluating DS-CDMA for UMTS/FPLMTS," IEEE 44$^{th}$ Vehicular Technology Conference, vol. 1, pp. 21-25 (Jun. 8-10, 1994).

(56) References Cited

OTHER PUBLICATIONS

Andermo, "Overview of CODIT Project," Proceedings of the RACE Mobile Telecommunications Summit, pp. 33-42 (Nov. 1995).
Attachment 2, *High Speed Data RLP* Lucent Technologies, Version 0.1, Jan. 16, 1997.
Azad et al., Multirate Spread Spectrum Direct Sequence CDMA Techniques, 1994, The Institute of Electrical Engineers.
Bell Labs Technical Journal, Lucent Technologies, vol. 2, No. 3, Summer 1997.
Budka et al., Cellular Digital Packet Data Networks, Bell Labs Technical Journal, Summer 1997, pp. 164-181.
Chih-Lin I et al., IS-95 Enhancements for Multimedia Services, Bell Labs Technical Journal, pp. 60-87, Autumn 1996.
Chih-Lin I et al., Load and Interference Based Demand Assignment (LIDA) for Integrated Services in CDMA Wireless Systems, Nov. 18, 1996, pp. 235-241.
Chih-Lin I et al., Multi-Code CDMA Wireless Personal Communications Networks, Jun. 18, 1995.
Chih-Lin I et al., Performance of Multi-Code CDMA Wireless Personal Communications Networks, Jul. 25, 1995.
Chih-Lin I et al., Variable Spreading Gain CDMA with Adaptive Control for True Packet Switching Wireless Network, 1995, pp. 725-730.
Chung, Packet Synchronization and Identification for Incremental Redundancy Transmission in FH-CDMA Systems, 1992, IEEE, pp. 292-295.
Data Service Options for Wideband Spread Spectrum Systems, TIA/EIA Interim Standard. TIA/EIA/IS-707, Feb. 1998.
*Data Service Options for Wideband Spread Spectrum Systems.* TIA/EIA Interim Standard. TIA/EIA/IS-707-A. Apr. 1999.
Data Service Options for Wideband Spread Spectrum Systems: Introduction, PN-3676. 1 (to be published as TIA/EIA/IS-707.1), Mar. 20, 1997 (Content Revision 1).
*Data Services Option Standard for Wideband Spread Spectrum Digital Cellular System.* TIA/EIA/IS-99. TIA/EIA Interim Standard. Jul. 1995.
*Data Services Options Standard for Wideband Spread Spectrum Systems: Packet Data Services.* PN-3676.5 (to be published as TIA/EIA/IS-707.5) Ballot Version, May 30, 1997.
Draft Text for "*95C" Physical Layer (Revision 4), Part 1, Document #531-981-20814-95C, Part 1 on 3GPP2 website (ftp://ftp.3gpp2.org/tsgc/working/1998/1298_Maui/WG3-TG1/531-98120814-95c,%20part%201.pdf, 1998).
Draft Text for "95C" Physical Layer (Revision 4), Part 2, Document #531-981-20814-95C, part 2 on 3GGP2 website (ftp://ftp.3gpp2.org/tsgc/working/1998/1298_Maui/WG3-TG1/531-98120814-95c,%20part%201.pdf, 1998).
Ejzak et al., Lucent Technologies Air Interface Proposal for CDMA High Speed Data Service, Revision 0.1, May 5, 1997.
Ejzak et al., Lucent Technologies Air Interface Proposal for CDMA High Speed Data Service, Apr. 14, 1997.
Ejzak, et al. *Proposal for High Speed Packet Data Service, Version 0.1.* Lucent Technologies, Jan. 16, 1997.
Elhakeem, Congestion Control in Signalling Free Hybrid ATM/CDMA Satellite Network, IEEE, 1995, pp. 783-787.
ETSI GSM European Standard (Telecommunications Series)—Draft EN 301 344 V6.4.0 (Aug. 1999). Digital cellular telecommunications system (Phase 2+); General Packet Radio Service (GPRS); Service description; Stage 2 (GSM 03.60 version 6.4.0 Release 1997).
ETSI GSM European Telecommunication Standard—Draft prETS 300 940, Seventh Edition (Jul. 1999). Digital cellular telecommunications system (Phase 2+); Mobile radio interface; Layer 3 specification (GSM 04/08 version 5.13.0 Release 1996).
ETSI GSM European Telecommunication Standard—ETS 300 910, Seventh Edition (Mar. 1999). Digital cellular telecommunications system (Phase 2+); Radio transmission and reception (GSM 05.05 version 5.10.1 Release 1996).
Geier, Jim, Wireless LANs. First Edition (1999), Macmillan Technical Publishing, USA.
Grube, Gary, et al., "In-Building Wireless Coverage Using a Second Mode," Motorola Technical Developments, U.S. Motorola, Inc., vol. 27 (May 1, 1996) XP 000594558, pp. 66-68.
Hall et al., Design and Analysis of Turbo Codes on Rayleigh Fading Channels, IEEE Journal on Selected Areas in Communications, vol. 16, No. 2, Feb. 1998, pp. 160-174.
High Data Rate (HDR), cdmaOne optimized for high speed, high capacity data, Wireless Infrastructure, Qualcomm, Sep. 1998.
Honkasalo, Harri. *High Speed Data Air Interface.* 1996.
IBE, "Networks and Remote Access. Protocols, Problems, and Solutions," DMK Publishers, p. 56 (2002).
*Introduction to cdma2000 Spread Spectrum Systems, Release C.* TIA/EIA Interim Standard. TIA/EIA/IS-2000. 1-C. May 2002.
Johnsson, "HiperLAN/2—The Broadband Radio Transmission Technology Operating in the 5 GHz Frequency Band," HyperLAN/2 Global Forum, Version 1.0, 1999.
Kaiser et al., Multi-Carrier CDMA with Iterative Decoding and Soft-Interference Cancellation, Proceedings of Globecom 1997, vol. 1, pp. 523-529.
Knisely, Douglas, N. Telecommunications Industry Association Subcommittee TR-45.5—*Wideband Spread Spectrum Digital Technologies Standards.* Banff, Alberta. Feb. 24, 1997 (TR45.5/97.02.24)21.
Knisely, Douglas, N. Telecommunications Industry Association Subcommittee TR-45.5—*Wideband Spread Spectrum Digital Technologies Standards, Working Group III—Physical Layer.* Banff, Alberta. Feb. 24, 1997 (TR45.5/97.02.24)22.
Knisely, Lucent Technologies Air Interface Proposal for CDMA High Speed Data Service, Jan. 16, 1997.
Krishnamurthy, et al., "Handoff in 3G Non-Homogenous Mobile Data Networks".
Krzymien et al., Rapid Acquisition Algorithms for Synchronization of Bursty Transmissions in CDMA Microcellular and Personal Wireless Systems, IEEE Journal on Selected Areas in Communications, vol. 14, No. 3, Apr. 1996, pp. 570-579.
Kumar et al, An Access Scheme for High Speed Packet Data Service on IS-95 based CDMA, Feb. 11, 1997.
Khun-Jush et al., "Structure and Performance of the HIPERLAN/2 Physical Layer," Vehicular Technology Conference (VTC) 1999, IEEE VTS $50^{th}$, vol. 5, pp. 2667-2671, Sep. 19-22, 1999.
Lau et al., A Channel-State-Dependent Bandwidth Allocation scheme for Integrated Isochronous and Bursty Media Data in a Cellular Mobile Information System, IEEE, 2000, pp. 524-528.
Liu et al., Channel Access and Interference Issues in Multi-Code DS-CDMA Wireless Packet (ATM) Networks, Wireless Networks 2, pp. 173-196, 1996.
Lucas, "Synchronisation Procedure in Up and Down-Link in the CoDiT Testbed," RACE Mobile Telecommunications Workshop (May 1994).
Lucent Technologies Presentation First Slide Titled, Summary of Multi-Channel Signaling Protocol, Apr. 6, 1997.
Lucent Technologies Presentation First Slide Titled, Why Support Symmetric HSD (Phase 1C), Feb. 21, 1997.
"Lucent Technologies announces the first wireless LAN PC Card for Original Equipment Vendors that is fully compliant with IEEE802.11 industry standards," WaveLAN, Nov. 4, 1997. http://web.archive.org/web/19990909132452/http://wavelan.com/news/news.html?id=11.
Melanchuk, Tim, et al., "CDPD and Emerging Digital Cellular Systems," Motorola Wireless Data Group, XP000628458, pp. 2-8 (1996).
Mobile Station-Base Station Compatibility Standard for Dual-Mode Wideband Spread Spectrum Cellular System, TIA/EIA Interim Standard, TIA/EIA/IS-95-A (Revision of TIA/EIA/IS-95), May 1995, pp. 1-742.
Mobile Station-Base Station Compatibility Standard for Wideband Spread Spectrum Cellular Systems, TIA/EIA Standard, TIA/EIA-95-B (Upgrade and Revision of TIA/EIA-95-A), Mar. 1999.
Morris, "UMTS and the Race II CODIT Project," IEEE Colloquium on Mobile Telecommunications Towards the Year 2000, pp. 8/1-8/4 (Oct. 1994).
*MSC-BS Interface (A-Interface) for Public 800 MHz.* TIA/EIA/IS-634-A. TIA/EIA Interim Standard (Revision of TIA/EIA/IS-634) Jul. 1998.

(56) References Cited

OTHER PUBLICATIONS

*MSC-BS Interface for Public 800 MHz*.TIA/EIA/IS-634. TIA/EIA Interim Standard, Dec. 1995.

Network Wireless Systems Offer Business Unit (NWS OBU), Feature Definition Document for Code Division Multiple Access (CDMA) Packet Mode Data Services, FDD-1444, Nov. 26, 1996.

Nokia, 3G Change Request Regarding MM states in UMTS, Doc. S2-99712, 3GPP TSG-SA meeting #7, Sophia Antipolis, France, Aug. 24-27, 1999.

Nokia Corporation and Nokia Inc.'s Response to the Amended Complaint and Amended Notice of Investigation, In the Matter of Certain Wireless Devices with 3G Capabilities and Components Thereof, Investigation No. 337-TA-800, Jan. 27, 2012.

Nokia Corporation and Nokia Inc.'s Response to the Complaint and Notice of Investigation, In the Matter of Certain Wireless Devices with 3G Capabilities and Components Thereof, Investigation No. 337-TA-800, Sep. 27, 2011.

Packet Data Service Option Standard for Wideband Spread Spectrum Systems, TIA/EIA Interim Standard, TIA/EIA/IS-657, Jul. 1996.

*Physical Layer Standard for cdma2000 Spread Spectrum Systems, Release C.* TIA/EIA Interim Standard. TIA/EIA/IS-2000.2C. May 2002.

Prasad & Teunissen, "A state-of-the-art HIPERLAN/2," Vehicular Technology Conference (VTC) 1999, IEEE vts $50^{th}$, vol. 5, pp. 2661-2666, Sep. 19-22, 1999.

Puleston, PPP Protocol Spoofing Control Protocol, Global Village Communication (UK) Ltd., Feb. 1996.

Reed et al., Iterative Multiuser Detection for CDMA with FEC: Near-Single-User Performance, IEEE Transactions on Communications, vol. 46, No. 12, Dec. 1998, pp. 1693-1699.

Reichert, "The Walkstation Project on Mobile Computing," Proceedings of the Personal, Indoor and Mobile Radio Communications 94, IEEE/ICCC, vol. 3, pp. 974-978, Sep. 18-23, 1994.

Response of Respondent Futurewei to Complaint Under Section 337 of the Tariff Act of 1930, as Amended, and Notice of Investigation, In the Matter of Certain Wireless Devices with 3G Capabilities and Components Thereof, Investigation No. 337-TA-800, Sep. 27, 2011.

Response of Respondent Huawei to Amended Complaint Under Section 337 of the Tariff Act of 1930, as Amended, and Amended Notice of Investigation, In the Matter of Certain Wireless Devices with 3G Capabilities and Components Thereof, Investigation No. 337-TA-800, Jan. 27, 2012.

Response of Respondent Huawei to Complaint Under Section 337 of the Tariff Act of 1930, as Amended, and Notice of Investigation, In the Matter of Certain Wireless Devices with 3G Capabilities and Components Thereof, Investigation No. 337-TA-800, Sep. 27, 2011.

Response of ZTE Corporation and ZTE (USA) to the Amended Complaint of Interdigital Communications, LLC, Interdigital Technology Corp., and IPR Licensing, Inc. under Section 337 of the Tariff Act of 1930, as Amended, and Notice of Investigation, In the Matter of Certain Wireless Devices with 3G Capabilities and Components Thereof, Investigation No. 337-TA-800, Jan. 27, 2012.

Shacham, et al., "A Selective-Repeat-ARQ Protocol for Parallel Channels and Its Resequencing Analysis," IEEE Transactions on Communications, XP000297814, 40 (4): 773-782 (Apr. 1997).

Simpson, W. (Editor). "RFC 1661—The Point-to-Point Protocol (PPP)." Network Working Group, Jul. 1994, pp. 1-35. http://www.faqs.org/rfcs/rfc1661.html.

Simpson, W. (Editor). "RFC 1662—PPP in HDLC-Like Framing." Network Working Group, Jul. 1994, pp. 1-17. http://www.faqs.org/rfcs/rfc1662.html.

Skinner et al., Performance of Reverse-Link Packet Transmission in Mobile Cellular CDMA Networks, IEEE, 2001, pp. 1019-1023.

Stage 1 Service Description for Data Services—High Speed Data Services (Version 0.10) CDG RF 38. Dec. 3, 1996.

Supplemental Response of Respondent Futurewei to Complaint Under Section 337 of the Tariff Act of 1930, as Amended, and Notice of Investigation, In the Matter of Certain Wireless Devices with 3G Capabilities and Components Thereof, Investigation No. 337-TA-800, Jan. 12, 2012.

*Tantivy Communications, Inc. v. Lucent Technologies, Inc.*, Lucent Technologies Inc.'s Preliminary Invalidity Contentions, Civil Action No. 2-04CV-79(TJW) (Dec. 8, 2004).

*Telecommunications Industry Association Meeting Summary*. Task Group I, Working Group III, Subcommittee TR45.5. Feb. 24-27, 1997. Banff, Alberta.

*Telecommunications Industry Association Meeting Summary*. Task Group I, Working Group III, Subcommittee TR45.5. Jan. 6-8, 1997. Newport Beach, California.

Torsner & Malmgren, "Radio Network Solutions for HIPERLAN/2," Vehicular Technology Conference (VTC) 1999 IEEE $49^{th}$, vol. 2, pp. 1217-1221, May 16-20, 1999.

*Upper Layer (Layer 3) Signaling Standard for cdma2000 Spread Spectrum Systems, Release C.* TIA/EIA Interim Standard. TIA/EIA/IS-2000.5-C. May, 2002.

Viterbi, "A Constructive (Backward Compatible) Approach for Migration to Wider Band Wireless Services," Qualcomm Incorporated, $3^{rd}$ Generation Wider Band CDMA Technology Conference (Feb. 25, 1998).

Viterbi, The Path to Next Generation Services with CDMA, Qualcomm Incorporated, 1998 CDMA Americas Congress, Los Angeles, California, Nov. 19, 1998.

Wang et al., The Performance of Turbo-Codes in Asynchronous DS-CDMA, IEEE Global Communications Conference, Phoenix, Arizona, USA, Nov. 3-8, 1997, Gol. III, pp. 1548-1551.

CDMA Development Group, "Industry's Leading CDMA Vendors—Lucent Technologies, Motorola, Nortel and QUALCOMM—Join to Develop Next Generation Digital Wireless Standards," available at www.cdg.org/news/press/1997.asp. CDA Press Release Archive, 1997.

Ylianttila et al., "Handoff Procedure for Heterogeneous Wireless Networks," Future Wireless Communication System, Global Telecommunications Conference—Globecom '99, vol. 5, pp. 2783-2787, 1999.

Zeisberg et al., "WLAN Evolution from HIPERLAN Type 2 to MEDIAN," Vehicular Technology Conference (VTC) 1999, IEEE VTS $50^{th}$, vol. 5, pp. 2656-2660, Sep. 19-22, 1999.

3GPP TSG SA WG2 Archives, Listsery Archives, Email from Susanna Kallio, pp. 1-7 (Aug. 20, 1999).

Answer, Affirmative Defenses, and Counterclaims to Amended Complaint, In the United States District Court for the District of Delaware, C.A. No. 13-011-RGA, Apr. 24, 2013.

Answers and Affirmative Defenses and Counterclaims of ZTE (USA) Inc., In the United States District Court for the District of Delaware, C.A. No. 13/0009-RGA, Jan. 31, 2013.

Answer and Counterclaims, In the United States District Court for the District of Delaware, C.A. No. 13-010 (RGA), Redacted Public Version, Mar. 7, 2013.

Answer and Counterclaims to Amended Complaint, In the United States District Court for the District of Delaware, C.A. No. 13-010 (RGA), Redacted Public Version, Apr. 1, 2013.

ETSI, "Digital cellular telecommunications system (Phase 2+); General Packet Radio Service (GPRS); Overall description of the GPRS radio interface; Stage 2 (GSM 03.64 version 6.1.0 Release 1997)," TS 101 350 V6.1.0 (Oct. 1998).

First Amended Answer and Counterclaims to Amended Complaint, In the United States District Court for the District of Delaware, C.A. No. 13-010 (RGA), Redacted Public Version, Aug. 6, 2013.

Hills, Alex, "Wireless Andrew: Bringing Mobile Computing to a University Community of 10000," IEEE Spectrum, Jun. 1999.

Katz, et al., "The Case for Wireless Overlay Networks," Chapter 23, Mobile Computing, 1996.

Meggers, et al., "Roaming Between GSM and Wireless LAN," Mobile Communication ACTS Summit, Nov. 27-29, 1996.

Petition for Review, In the United States Court of Appeals for the Federal Circuit, Case: 14-1176, Dec. 20, 2013.

Public Version of Initial Determination on Violation of Section 337 and Recommended Determination on Remedy and Bond, In the Matter of Certain Wireless Devices with 3G and/or 4G Capabilities and Components Thereof, Investigation No. 337-TA-868, Jun. 13, 2014.

Report of the 3GPP SA WG2 Meeting, Sophia Antipolis, France, Aug. 24-26, 1999.

(56) References Cited

OTHER PUBLICATIONS

Third Generation Partnership Project, "Technical Specification Group; Working Methods (3G TR 21.900 version 3.1.0)," 3G TR 21.900 V3.1.0 (Jul. 1999).
TR45 Data Service Options for Wideband Spread Spectrum Systems: Introduction and Service Guide, TIA/EIA/IS-707.1 (PN-3676.1), Feb. 1998.
ZTE (USA) Inc.'s Amended Answer, Affirmative Defenses, and Counterclaims to Plaintiffs' Amended Complaint, In the United States District Court for the District of Delaware, C.A. No. 13-009-RGA, Redacted Public Version, Aug. 7, 2013.
ZTE Corp.'S Amended Answer, Affirmative Defenses, and Counterclaims to Plaintiffs' Amended Complaint, C.A. No. 13-009-RGA, Redacted Public Version, Sep. 3, 2013.
ZTE (USA) Inc.'s Answer, Affirmative Defenses, and Counterclaims to Plaintiffs' Amended Complaint, C.A. No. 13-009-RGA, Mar. 22, 2013.
In the Matter of Certain Wireless Devices With 3G Capabilities and Components Thereof, Commission Opinion, Investigation No. 337-TA-800 (Feb. 19, 2014).
In the Matter of Certain Wireless Devices With 3G Capabilities and Components Thereof, Initial Determination, Investigation No. 337-TA-800 (Jun. 28, 2013). (Due to the size of the document, it was uploaded to EFS-web in three parts).
Pahlavan et al., "Handoff in Hybrid Mobile Data Networks," IEEE Personal Communications, vol. 7, Issue 2, pp. 34-47 (Apr. 2000).
Pang et al., "Mobility and Session Management: UMTS vs. cdma2000," IEEE Wireless Communications, vol. 11, Issue 4, pp. 30-43 (Aug. 2004).
Rupar et al., "Satellite VSAT Networking Using CDMA," American Institute of Aeronautics and Astronautics (Oct. 28-30, 1998).
Seppanen, "Euromicro Summer School on Mobile Computing '98," VTT Symposium 183, Oulu, Finalnd (Aug. 20-21, 1998).
ETSI PT SMG, "Working Procedures for SMG and PT SMG; Part 1; Standards Management," Special Mobile Group, GSM/UMTS 01.00, Version 5.2.0 (Mar. 1998).
Answer and Counterclaims, *InterDigital Communications, Inc. et al. v. Huawei Technologies Co., Ltd. et al.*, in the United States District Court for the District of Delaware, C.A. No. 13-008-RGA, pp. 1-32 (Jan. 24, 2013).
Answer to Amended Complaint, *InterDigital Communications, Inc. et al. v. Huawei Technologies Co., Ltd. et al.*, in the United States District Court for the District of Delaware, C.A. No. 13-008-RGA, pp. 1-57 (Mar. 22, 2013).
Amended Answer to Amended Complaint, *InterDigital Communications, Inc. et al. v. Huawei Technologies Co., Ltd. et al.*, in the United States District Court for the District of Delaware, C.A. No. 13-008-RGA, pp. 1-55 (May 1, 2013).
Petition for Review, In the United States Court of Appeals for the Federal Circuit, Case: 14/1419, pp. 1-23 (Apr. 17, 2014).
Errata to Response of Respondents Samsung Electronics Co., Ltd., Samsung Electronics America, Inc., and Samsung Telecommunications America, LLC to the Complaint and Notice of Investigation, In the Matter of Certain Devices with 3G and/or 4G Capabilities and Components Thereof, Investigation No. 337-TA-868, Feb. 28, 2013.
Errata to Response of Huawei Respondents to Complaint Under Section 337 of the Tariff Act of 1930, As Amended, and Notice of Investigation, In the Matter of Certain Wireless Devices with 3G and/or 4G Capabilites and Components Thereof, Investigation No. 337-TA-868, Mar. 1, 2013.
Huawei Respondents Response to Complaint Under Section 337 of the Tariff Act of 1930, As Amended, and Notice of Investigation, In the Matter of Certain Wireless Devices with 3G and/or 4G Capabilites and Components Thereof, Investigation No. 337-TA-868, Feb. 21, 2013.
Nokia Corporation and Nokia Inc.'s Response to the Complaint of InterDigital Communications, Inc., InterDigital Technology Corporation, IPR Licensing, Inc., and InterDigital Holdings, Inc. Under Section 337 of the Tariff Act of 1930, As Amended, and Notice of Investigation, In the Matter of Certain Wireless Devices with 3G and/or 4G Capabilites and Components Thereof, Investigation No. 337-TA-868, Mar. 1, 2013.
Response of Respondents Samsung Electronics Co., Ltd., Samsung Electronics America, Inc., and Samsung Telecommunications America, LLC to the Compliant and Notice of Investigation, In the Matter of Certain Wireless Devices with 3G and/or 4G Capabilites and Components Thereof, Investigation No. 337-TA-868, Feb. 21, 2013.
Response of ZTE Corporation and ZTE (USA) to the Complaint of InterDigital Communications, LLC Under Section 337 of the Tariff Act of 1930, As Amended, and Notice of Investigation, In the Matter of Certain Wireless Devices with 3G and/or 4G Capabilities and Components Thereof, Investigation No. 337-TA-868, Feb. 22, 2013.
Barry, A Flexible Control Architecture for the UMTS Mobile Terminal, University of Limerick, pp. 1-330 (Nov. 27, 1998).
Bennington et al., Wireless Andrew: Experience Building a High Speed, Campus-Wide Wireless Data Network, MobiCom '97 Proceedings of the 3rd annual ACM/IEEE international conference on Mobile computing and networking, pp. 55-65 (Sep. 9, 1997).
Bhagwat et al., Enhancing Throughput Over Wireless LANs Using Channel State Dependent Packet Scheduling, IEEE (1996).
Bharghavan, Challenges and Solutions to Adaptive Computing and Seamless Mobility over Heterogeneous Wireless Networks, Wireless Personal Communications, vol. 4, pp. 217-236 (1997).
Cacopardi et al., An Orthogonal Multicarrier DS-SS Radio Access Scheme for Wireless LAN, IEEE $4^{th}$ International Symposium, Spread Spectrum Techniques and Applications Proceedings vol. 3, pp. 1325-1329 (Sep. 1996).
Chambers, Personal Mobile Satellite Communications, IEE Colloquium on Personal Communications: Circuits, Systems and Technology, pp. 2/1-2/9 (Jan. 22, 1993).
Chennakeshu et al., Dual-Mode Satellite-Cellular Phones, The Institution of Electrical Engineers, pp. 7/1-7/5 (1997).
Dettmar et al., Modulation for Hiperlan Type 2, IEEE Vehicular Technology Conference, vol. 2, pp. 1094-1100 (May 1999).
Dhaou, A Novel Load-Sharing Algorithm for Energy Efficient MAC Protocol Compliant With 802.11 WLAN, IEEE, Vehicular Technology Conference, vol. 2, pp. 1238-1242 (1999).
Ericsson, Ericsson R290 Satellite, Mobile Phone for the Globalstar/GSM Network, User's Guide (1999).
Ericsson, Ericsson Solution Chosen for World's First Combined DECT/GSM Communications Service, Press Release (Jun. 18, 1999).
ETSI GSM European Telecommunication Standard—Draft prETS 300 930, Fourth Edition, (Jul. 1998). Digital cellular telecommunications system (Phase 2+); Functions related to Mobile Station (MS) in idle mode and group receive mode (GSM 03.22 version 5.3.0 Release 1996).
ETSI GSM European Telecommunication Standard—Draft prETS 300 939, Second Edition, (Jan. 1998). Digital cellular telecommunications system (Phase 2+); Mobile radio interface layer 3 specification (GSM 04.07 version 5.6.0).
ETSI GSM European Telecommunication Standard—Draft prETS 300 940, Second Edition, (Aug. 1997). Digital cellular telecommunications system (Phase 2+); Mobile radio interface layer 3 specification (GSM 04.08 version 5.6.0).
ETSI GSM European Standard (Telecommunications Series)—Draft EN 301 344 V6.1.1 (Aug. 1998). Digital cellular telecommunications system (Phase 2+); General Packet Radio Service (GPRS); Service description; Stage 2; (GSM 03.60 version 6.1.1 Release 1997).
ETSI GSM European Standard (Telecommunications Series)—Draft EN (04.60) V6.0.0 (Mar. 1998). Digital cellular telecommunications system (Phase 2+); General Packet Radio Service (GPRS); Mobile Station (MS)—Base Station System (BSS) interface; Radio Link Control/Medium Access Control (RLC/MAC) protocol (GSM 04.60 version 6.0.0).
ETSI GSM European Standard (Telecommunications Series)—Draft EN 301 349 V6.1.0 (Aug. 1998). Digital cellular telecommunications system (Phase 2+); General Packet Radio Service (GPRS); Mobile Station (MS)—Base Station System (BSS) interface; Radio Link Control/Medium Access Control (RLC/MAC) protocol (GSM 04.60 version 6.1.0 Release 1997).

(56) References Cited

OTHER PUBLICATIONS

Grillo et al., Towards Third Generation Mobile Systems: A European Possible Transition Path, Computer Networks and ISDN Systems, vol. 25, Issue 8, pp. 947-961 (Mar. 1993).
Hills et al., Seamless Access to Multiple Wireless Data Networks: A Wireless Data Network Infrastructure at Carnegie Mellon University, IEEE Personal Communications, pp. 56-63 (Feb. 1996).
Johnson et al., Truly Seamless Wireless and Mobile Host Networking. Protocols for Adaptive Wireless and Mobile Networking, Personal Communications, IEEE, vol. 3, Issue 1 (Feb. 1996).
Kryzmien et al., Rapid Acquisition Algorithms for Synchronization of Bursty Transmissions in CDMA Microcellular and Personal Wireless Systems, IEEE Journal on Selected Areas in Communications, vol. 14, No. 3, pp. 570-579 (Apr. 1996).
Lin et al., Heterogeneous Personal Communications Services: Integration of PCS Systems, IEEE Communications Magazine, pp. 106-112 (Sep. 1996).
Lemiläinen et al., IP Telephony GSM Interworking, Global Telecomunications Conference, Future Wireless Communication System, pp. 2709-2713 (1999).
Lucent Technologies, WaveLAN—News Article: Lucent Tecnologies' new IEEE 802.11 compliant WaveLAN® family (Apr. 23, 1998).
Mobile Station-Base Station Compatibility Standard for Dual-Mode Wideband Spread Spectrum Cellular System, TIA/EIA Interim Standard, TIA/EIA/IS-95, Jul. 1993.
Müller-Wilken, Mobile Gerate in verteilten Anwendungsumgebungen: Ein Integrationsansatz zwischen Abstraktion und Migration (Apr. 1992).
Newman et al., Flow Labelled IP: A Connectionless Approach to ATM, IEEE pp. 1-11. (Mar. 1996).
Nilsson, Toward Third-Generation Wireless Communication, Ericsson Review No. 2, pp. 68-77 (1998).
Nokia, 3G Change Request Regarding Hierarchical tracking concept, recovery of temporarily lost mobiles, and MM and SM relation, Doc. S2-99709, 3GPP TSG-SA meeting #7, Sophia Antipolis, France, Aug. 24-27, 1999.
Nokia, 3G Change Request Regarding Description of UTRAN coordination, Doc. S2-99710, 3GPP TSG-SA meeting #7, Sophia Antipolis, Frrance, Aug. 24-27, 1999.
Nokia, 3G Change Request Regarding SRNC relocation in relation with SGSN change, Doc. S2-99711, 3GPP TSG-SA meeting #7, Sophia Antipolis, France, Aug. 24-27, 1999.
Nokia, 3G Change Request Regarding Introduction of Iu Release procedure, Doc. S2-99713, 3GPP TSG-SA meeting #7, Sophia Antipolis, France, Aug. 24-27, 1999.
Nokia, 3G Change Request Regarding Introduction of Service Request procedure, Doc. S2-99715, 3GPP TSG-SA meeting #7, Sophia Antipolis, France, Aug. 24-27, 1999.
Nokia, 3G Change Request Regarding Introduction of Location Reporting procedure, Doc. S2-99718, 3GPP TSG-SA meeting #7, Sophia Antipolis, France, Aug. 24-27, 1999.
Nokia, Proposal Regarding MM and SM States Relations, Doc. S2-99716, 3GPP TSG-SA meeting #7, Sophia Antipolis, France, Aug. 24-27, 1999.
Nokia, Proposal Regarding UE vs. Network Initiated Routing Area Update in SGSN Handover, Doc. S2-99719, 3GPP TSG-SA meeting #7, Sophia Antipolis, France, Aug. 24-27, 1999.
Nokia, Structure of Stage2 Document for Location Services in UMTS, TSG S2-99722, Sophia-Antipolis, France, Aug. 24-27, 1999.
O'Connell, Dual Mode GSM/DECT Handset, The Institution of Electrical Engineers, pp. 5/1-5/7 (1994).
Oono et al., The Proposal of Wireless Multimedia Communication System with Integration of Packet-Switched and Circuit-Switched Channels, GLOBECOM, pp. 120-125 (1998).
Pacific Telecommunications Council, Pacific Telecommunications Review, vol. 24, No. 2, (2002).
Pahlavan et al., Wideband Local Access: Wireless LAN and Wireless ATM, IEEE Communications Magazine, pp. 34-40 (Nov. 1997).
Perkins, C. (Editor). "RFC 2002—IP Mobility Support." Network Working Group, Oct. 1996, pp. 1-69. http://www.faqs.org/rfcs/rfc2002.html.
Pichna, Current (Wireless) Inter-technology Roaming Efforts, VTT Technical Research Centre of Finland (1998).
Raychaudhuri et al., WATMnet: a prototype wireless ATM system for multimedia personal communication, IEEE International Conference on Communications, vol. 1, pp. 469-477 (1996).
Saluvere et al., Direct Sequence Spread Spectrum Digital Radio DSP Prototyping Using Xilinx FPGAs, Proceedings of the $4^{th}$ International Workshop (Sep. 1994).
Sreetharan et al., Cellular Digital Packet Data, Artech House, 1996.
Stemm et al., Vertical Handoffs in Wireless Overlay Networks, Mobile Networks and Applications 3, pp. 335-350 (1998).
*Tantivy Communications, Inc.* v. *Lucent Technologies, Inc.*, Markman Order, Civil Action No. 2-04CV-79(TJW) (Aug. 8, 2005).
Wang et al., Policy-Enabled Handoffs Across Heterogeneous Wireless Networks, Second IEEE Workshop on Mobile Computing Systems and Applications, 1999. Proceedings, pp. 51-60. (Feb. 1999).
Wolisz, Mobility in Multimedia Communication, Technical University of Berlin (Apr. 1999).
Zhao, Handover Techniques and Network Integration Between GSM and Satellite Mobile Communications Systems, Centre for Communication Systems Research, University of Surrey, pp. I-210. (Jun. 1997).
ETSI GSM European Standard (Telecommunications Series)—EN 301 113 V6.1.1 (Nov. 1998). Digital cellular telecommunications system (Phase 2+); General Packet Radio Service (GPRS); Service description; Stage 1; (GSM 02.60 version 6.1.1 Release 1997).
ETSI GSM European Standard (Telecommunications Series)—EN 301 349 V7.5.0 (Jul. 2000). Digital cellular telecommunications system (Phase 2+); General Packet Radio Service (GPRS); Mobile Station (MS)—Base Station System (BSS) interface; Radio Link Control/Medium Access Control (RLS/MAC) protocol (GSM 04.60 version 7.5.0 Release 1998).
IEEE Standard for Information Technology—802.1F-1993, IEEE Standards for Local and Metropolitan Area Networks: Common Definitions and Procedures for IEEE 802 Management Information, Approved Nov. 9, 1993.
IEEE Standard for Information Technology—802.1B-1995, Information technology, Telecommunications and information exchange between systems, Local and metropolitan area networks, Common specifications, Part 2: LAN/MAN mangement.
IEEE Standard for Information technology—IEEE 802.3u-1995, IEEE Standards for Local and Metropolitan Area Networks: Supplement to Carrier Sense Multiple Access with Collision Detection (CSMA/CD) Access Method and Physical Layer Specification, Media Access Control (MAC) Parameters, Physical Layer, Medium Attachment Units, and Repeater for 100 Mb/s Operation, Type 100BASE-T (Clauses 21-30) Approved Jun. 14, 1995.
Brenner, Pablo, "A Technical Tutorial on the IEEE 802.11 Protocol", 1997, pp. 1-18, Breeze Wireless Communications, Ltd., downloaded from http://mw.breezecencom.com.
IEEE Standard for Information technology—IEEE 802.11a-1999, Corrections to Supplement to IEEE Standard for Information technology, Telecommunications and information exchange between systems, Local and metropolitan area networks, Specific requirements, Part 11: Wireless LAN Medium Access Control (MAC) and Physical Layer (PHY) specifications: High-Speed Physical Layer in the 5 GHz Band, Aug. 10, 2000.
IEEE Standard for Information technology—IEEE 802.11b-1999, Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band. Approved Sep. 16, 1999.
Institute of Electrical and Electronics Engineers 802.11 Wireless LAN Standard, The MAC Layer, pp. 1-2, downloaded Jul. 15, 1999 from http://www.wlana.com/intro/standard/mac.html.

(56) References Cited

OTHER PUBLICATIONS

"WaveLAN IEEE 802.11 compliant wireless Local Area Networking Now Available for Apple Computers," WaveLAN, Oct. 16, 1998. http://web.archive.org/web/19990909170638/http://wavelan.com/news/news.html?id=30.

Tuch, "An IEEE 802.11 WLAN Primer," Communication Systems Design, Sep. 1997.

Zyren & Petrick, "Brief Tutorial on IEEE 802.11 Wireless LANs," Intersil Application Note 9289, Feb. 1999.

Crow et al., IEEE 802.11 Wireless Local Area Networks, IEEE Communications Magazine, pp. 116-126 (Sep. 1997).

Deng et al., A Priority Scheme for IEEE 802.11 DCF Access Method, IEICE Trans. Commun., vol. E82-B, No. 1 pp. 96-102 (Jan. 1999).

IEEE Standard for Information technology—IEEE 802.11a-1999, Supplement to IEEE Standard for Information technology, Telecommunications and information exchange between systems, Local and metropolitan area networks, Specific requirements, Part 11: Wireless LAN Medium Access Control (MAC) and Physical Layer (PHY) specifications: High-Speed Physical Layer in the 5 GHz Band, Approved Sep. 16, 1999.

IEEE Standard for Information technology—IEEE 802.11a-1999 (R2003), Supplement to IEEE Standard for Information technology, Telecommunications and information exchange between systems, Local and metropolitan area networks, Specific requirements, Part 11: Wireless LAN Medium Access Control (MAC) and Physical Layer (PHY) specifications: High-Speed Physical Layer in the 5 GHz Band, Reaffirmed Jun. 12, 2003.

IEEE Standard for Information technology—IEEE 802.11b-1999 (R2003), Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band. Reaffirmed Jun. 12, 2003.

Official IEEE 802.11 Working Group Project Timelines, http://www.ieee802.org/11/Reports/802.11_Timelines.htm, Dec. 17, 2013.

Visser et al., Voice and data transmission over an 802.11 wireless network, IEEE, (1995).

Ott, David TR45.5, CDMA WBSS Technical Standards Meeting Summary. Feb. 24-28, 1997 Banff, Alberta.

IEEE Standard for Information technology—IEEE 802.3-1985, IEEE Standard for Local Area Networks: Carrier Sense Multiple Access with Collision Detection (CSMA/CD) Access Method and Physical Layer Specifications.

CODIT Final Review Report, Issue 2.0 (Nov. 21, 1995).

IEEE Standard for Information technology—IEEE Std. 802.11-1997, Telecommunications and information exchange between systems, Local and metropolitan area networks, Specific requirements, Part 11: Wireless LAN Medium Access Control (MAC) and Physical Layer (PHY) specifications, Jun. 26, 1997.

IEEE Standard for Information technology—IEEE 802.2-1998, IEEE Standard for Information technology, Telecommunications and information exchange between systems, Local and metropolitan area networks, Specific requirements, Part 2: Logical Link Control (May 7, 1998).

IEEE Standard for Information technology—IEEE 802.3-1998, Information technology, Telecommunications and information exchange between systems, Local and metropolitan area networks, Specific requirements, Part 3: Carrier sense multiple access with collision detection (CSMA/CD) access method and physical layer specifications.

High Data Rate (HDR) Solution, Qualcomm, Dec. 1998.

3GPP2 Ix(R-O) Interface Stage-2 Descriptions (Jun. 26, 1999).

IEEE Standard for Information technology—ANSI/IEEE 802.11, 1999 Edition, Telecommunications and information exchange between systems, Local and metropolitan area networks, Specific requirements, Part 11: Wireless LAN Medium Access Control (MAC) and Physical Layer (PHY) specifications. Redesignated as ISO/IEC 8802-11: 1999(E).

3GPP Technical Specification—TS 25.201 v2.1.0 (Jun. 1999). 3rd Generation Partnership Project (3GPP); Technical Specification Group (TSG); Radio Access Network (RAN); Working Group 1 (WG1); Physical layer—General description.

3GPP Technical Specification—TS 25.211 v2.1.0 (Jun. 1999). 3rd Generation Partnership Project (3GPP); Technical Specification Group (TSG); Radio Access Network (RAN); Working Group 1 (WG1); Physical channels and mapping of transport channels onto physical channels (FDD).

3GPP Technical Specification—TS 25.213 v2.1.0 (Jun. 1999). 3rd Generation Partnership Project (3GPP); Technical Specification Group (TSG); Radio Access Network (RAN); Working Group 1 (WG1); Spreading and modulation (FDD).

3GPP Technical Specification—TS 25.302 v2.3.0 (Jun. 1999). 3rd Generation Partnership Project (3GPP); Technical Specification Group (TSG) RAN; Working Group 2 (WG2); Services provided by the Physical layer.

ETSI GSM Technical Specification—GSM 05.01 V5.4.0 (Apr. 1998). Digital cellular telecommunications system (Phase 2+); Physical layer on the radio path; General description (GSM 05.01 version 5.4.0).

ETSI GSM Technical Specification—TS 100 939 V6.1.0 (Jul. 1998). Digital cellular telecommunications system (Phase 2+); Mobile radio interface signaling layer 3; General aspects (GSM 04.07 version 6.1.0 Release 1997).

ETSI GSM Technical Specification—TS 100 522 V6.1.0 (Jul. 1998). Digital cellular telecommunications system (Phase 2+); Network architecture (GSM 03.02 version 6.1.0 Release 1997).

ETSI GSM Technical Specification—TS 101 297 V6.1.0 (Jul. 1998). Digital cellular telecommunications system (Phase 2+); General Packet Radio Service (GPRS); Mobile Station (MS)—Serving GPRS Support Node (SGSN); Subnetwork Dependent Convergence Protocol (SNDCP) (GSM 04.65 version 6.1.0 Release 1997).

ETSI GSM Technical Specification—TS 101 351 V6.1.0 (Jul. 1998). Digital cellular telecommunications system; General Packet Radio Service (GPRS); Mobile Station—Serving GPRS Support Node (MS-SGSN) Logical Link Control (LLC) Layer Specification (GSM) 04.64 version 6.1.0 Release 1997).

ETSI GSM Technical Specification—TS 100 939 V7.1.0 (Aug. 1999). Digital cellular telecommunications system (Phase 2+); Mobile radio interface signalling layer 3; General aspects (GSM 04.07 version 7.1.0 Release 1998).

ETSI GSM Technical Specification—ETSI TS 101 113 V7.2.0 (Aug. 1999). Digital cellular telecommunications system (Phase 2+); General Packet Radio Service (GPRS); Service description; Stage 1 (GSM 02.60 version 7.2.0 Release 1998).

ETSI Meeting Coversheet for approval of GSM 03.64 v.2.1.1 Overall description of the GPRS radio interface; Stage 2, ETSI TC SMG, Meeting #22, Kristiansand, Norway, Jun. 9-13, 1997.

ETSI Technical Specification—Draft TS 03 64 V2.1.1 (May 1997) Digital cellular telecommunications system (Phase 2+); General Packet Radio Service (GPRS); Overall description of the GPRS radio interface; Stage 2 (GSM 03.64 version 2.1.1).

ETSI Technical Report—TR 101 031 V.2.2.1 (Jan. 1999). Broadband Raadio Access Networks (BRAN); High Performance Radio Local Area Network (HIPERLAN) Type 2; Requirements and architectures for wireless broadband access.

ETSI GSM Technical Specification—TS 100 573 V6.1.1 (Jul. 1998). Digital cellular telecommunications system (Phase 2+); Physical layer on the radio path; General description (GSM 05.01 version 6.1.1 Release 1997).

ETSI GSM Technical Specification—TS 100 940 V6.1.1 (Aug. 1998). Digital cellular telecommunications system (Phase 2+); Mobile radio interface layer 3 specification (GSM 04.08 version 6.1.1 Release 1997).

ETSI GSM Technical Specification—GSM 05.08 V6.1.1 (Apr. 1998). Digital cellular telecommunications system (Phase 2+); Radio Subsystem link control (GSM 05.08 version 6.1.1).

"ETSI Drafting Rules (EDRs)," (May 2014).

Intersil, Brief Tutorial on IEEE 802.11 Wireless LANs, pp. 1-7 (Feb. 1999).

Motorola, Version 1.0. *Motorola High Speed Data Air Interface Proposal Comparisions and Recommendations.* Jan. 27, 1997.

(56) References Cited

OTHER PUBLICATIONS

Cellular Digital Packet Data, System Specification, Release 1.1, Jan. 19, 1995.
3GPP Technical Specification—3G TS 25.101 v2.0.0 (Jun. 1999). 3rd Generation Partnership Project (3GPP); Technical Specification Group (TSG); Radio Access Network (RAN); Working Group 1 (WG1); Multiplexing and channel coding (FDD).
3GPP Technical Specification—TS 25.212 v2.0.0 (Jun. 1999). 3rd Generation Partnership Project (3GPP); Technical Specification Group (TSG); Radio Access Network (RAN); Working Group 1 (WG1); Multiplexing and channel coding (FDD).
Razavi, A 2.4-GHz CMOS Receiver for IEEE 802.11 Wireless LAN's, IEEE Journal of Solid-State Circuits, vol. 34, No. 10 pp. 1382-1385 (Oct. 1999).
3GPP Technical Report—3G TR 23.930 v3.0.0 (Jul. 1999). 3rd Generation Partnership Project; Technical Specification Group Services and System Aspects—Iu Principles.
3GPP Technical Specification—3G TS 23.121 v3.0.0 (Jul. 1999). 3rd Generation Partnership Project; Technical Specification Group Services and Systems Aspects; Architectural Requirements for Release 1999.
3GPP Technical Specification—TS 24.008 v3.0.0 (Jul. 1999). 3rd Generation Partnership Project; Universal Mobile Telecommunications System; Mobile radio interface layer 3 specification, Core Network Protocols—Stage 3.
3GPP Technical Specification—TS 25.301 v3.0.0 (Apr. 1999). 3rd Generation Partnership Project (3GPP); Technical Specification Group (TSG) RAN; Working Group 2 (WG2); Radio Interface Protocol Architecture.
ETSI GSM Technical Specification—GSM 04.01 V5.0.0 (Nov. 1996). Digital cellular telecommunications system; Mobile Station—Base Station System (MS-BSS) interface General aspects and principles (GSM 04.01).
ETSI GSM European Standard (Telecommunications Series)—GSM 05.02 V7.0.0 (Mar. 1999). Digital cellular telecommunications system (Phase 2+); Multiplexing and multiple access on the radio path (GSM 05.02 version 7.0.0 Release 1998).
ETSI Technical Specification—Draft GSM 03 64 V6.0.0 (Apr. 1998). Digital cellular telecommunications system (Phase 2+); General Packet Radio Service (GPRS); Overall description of the GPRS radio interface; Stage 2 (GSM 03.64 version 6.0.0).
ETSI GSM Technical Specification—GSM 03.60 V6.0.0 (Mar. 1998). Digital cellular telecommunications system (Phase 2+); General Packet Radio Service (GPRS); Service description; Stage 2 (GSM 03.60 version 6.0.0).
ETSI GSM Technical Specification—GSM 01.02 V.6.0.1 (Nov. 1998). Digital cellular telecommunications system (Phase 2+); General description of a GSM Public Land Mobile Network (PLMN) (GSM 01.02).
ETSI GSM Technical Specification—ETSI TS 101 350 V7.0.0 (Jul. 1999). Digital cellular telecommunications system (Phase 2+); General Packet Radio Service (GPRS); Overall description of the GPRS radio interface; Stage 2 (GSM 03.64 version 7.0.0 Release 1998).
ETSI GSM Technical Specification—GSM 02.60 V7.0.0 (Apr. 1998). Digital cellular telecommunications system (Phase 2+); General Packet Radio Service (GPRS); Service description; Stage 1 (GSM 02.60 version 7.0.0 Release 1998).
ETSI GSM Technical Specification—GSM 05.01 V7.0.0 (Mar. 1999). Digital cellular telecommunications system (Phase 2+); Physical layer on the radio path; General description (GSM 05.01 version 7.0.0 Release 1998).
Hindelang et al., Using Powerful "Turbo" Codes for 14.4 Kbit/s Data Service in GSM or PCS Systems, IEEE Global Communications Conference, Phoenix, Arizona, USA, Nov. 3-8, 1997, vol. II, pp. 649-653.
*Support for 14.4 kbps Data Rate and PCS Interaction for Wideband Spread Spectrum Cellular Systems.* TSB74, Dec. 1995. TIA/EIA Telecommunications Systems Bulletin.
Ericsson and BT Launch DECT/GSM System, Telecomworldwire (Jun. 22, 1999).
Chambers, Market in Waiting, Comm. Int'l, pp. 72-77 (Sep. 1996).
Official IEEE 802.11 Working Group Project Timelines, Oct. 25, 2012.
Data Standard, Packet Data Section, PN-3676.5 (to be published as TIA/EIA/IS-Data.5), Dec. 8, 1996, Version 02 (Content Revision 03).
3GPP Website, The Mobile Broadband Standard, 3GPP Specification Release version matrix, pp. 1-170 (obtained Oct. 21, 2014).
*Interdigital Communications, Inc. et al. v. Nokia Corporation et al.*, Memorandum Opinion, Civil Action No. 1:13-cv-00010-RGA (Apr. 24, 2015).
ETSI PT SMG, Working Procedures for SMG and PT SMG; Part 1; Standards Management, Special Mobile Group, GSM/UMTS 01.00 V. 5.2.0 (Mar. 1998).
ETSI Website, Approval Processes, pp. 1-2 (obtained Jun. 10, 2014).
ETSI, Digital cellular telecommunications system (Phase 2+); General Packet Radio Service (GPRS) Service description; Stage 2 (3GPP TS 03.60 version 6.11.0 Release 1997), ETS ITS 101 344 V6.11.0 (Sep. 2002).
ETSI, ETSI Drafting Rules (EDRs), Version adopted by ETSI Director-General, pp. 1-45 (May 20, 2014).
Heine et al., "GPRS: Gateway to Third Generation Mobile Networks," Mobile Communications Series, pp. 89-92 (2003).
In the Matter of Certain Wireless Devices with 3G and/or 4G Capabilities and Components Thereof, Excerpt from Deposition Transcript of Steven W. McLaughlin, Ph. D., Investigation No. 337-TA-868 (Sep. 26, 2013).
In the Matter of Certain Wireless Devices with 3G Capabilities and Components Thereof, Direct Witness Statement of Dr. Harry V. Bims, Investigation No. 337-TA-800 (Jan. 7, 2013).
In the Matter of Certain Wireless Devices with 3G Capabilities and Components Thereof, Rebuttal Witness Statement of Dr. Harry Bims, Investigation No. 337-TA-800 (Jan. 18, 2013).
In the Matter of Certain Wireless Devices with 3G Capabilities and Components Thereof, Excerpt from Hearing Testimony of Dr. Harry Bims, Investigation No. 337-TA-800, pp. 1-10 (Feb. 15, 2013).
In the Matter of Certain Wireless Devices with 3G Capabilities and Components Thereof, Excerpts from the testimony of Dr. Wayne Stark during the hearing before the International Trade Commission, Investigation No. 337-TA-800 (Feb. 20, 2013).
*Interdigital Communications Inc. et al., V. Huawei Technologies Co., Ltd., and Interdigital Communications Inc. et al., V. ZTE Corporation et al., and Interdigital Communications Inc. et al., V. Nokia Corporation et al.*, Amended Joint Claim Construction Chart, Civil Action Nos. 1:13-cv-00008-RGA, 1:13-cv-00009-RGA, 1:13-cv-00010-RGA (D. Del.) (Oct. 8, 2013).
*Interdigital Communications Inc. et al., V. Huawei Technologies Co., Ltd., and Interdigital Communications Inc. et al., V. ZTE Corporation et al., and Interdigital Communications Inc. et al., V. Nokia Corporation et al.*, Joint Claim Construction Brief, Civil Action Nos. 1:13-cv-00008-RGA, 1:13- cv-00009-RGA, 1:13-cv-00010-RGA (D. Del.) (Nov. 21, 2013).
*Interdigital Communications Inc. et al., V. ZTE Corporation et al., and Interdigital Comunications, Inc. et al. V. Nokia Corporation et al.*, Markman Opinion, Civil Action No. 1:13- cv-00009-RGA (D. Del.) (Apr. 22, 2014).
*Interdigital Communications Inc. et al., V. ZTE Corporation et al.*, Excerpt from Videotaped Deposition of Steven W. McLaughlin, Ph. D., Civil Action No. 1:13-cv-00009-RGA (D. Del.) (May 14, 2014).
*Interdigital Communications Inc. et al., V. ZTE Corporation et al.*, Trial Transcript, Civil Action No. 13-00009-RGA (Oct. 20, 2014).
*Interdigital Communications Inc. et al., V. ZTE Corporation et al.*, Opening Brief in Support of ZTE's Renewed Motion for Judgment as a Matter of Law that the Asserted Patent Claims are not Infringed and, in the Alternative, for a New Trial, C.A. No. 13-009-RGA (Nov. 26, 2014).
*Interdigital Communications Inc. et al., V. ZTE Corporation et al.*, Verdict Form, Civil Action No. 1-13-cv-00009-RGA (Oct. 28, 2014).
*Interdigital Communications Inc. et al., V. ZTE Corporation et al., and Interdigital Comunications, Inc. et al. V. Nokia Corporation et al.*, Memorandum Opinion, Civil Action No. 1:13- cv-00009-RGA and Civil Action No. 1:13-cv-00010-RGA (Mar. 6, 2015).

(56) References Cited

OTHER PUBLICATIONS

*Interdigital Communications, Inc. et al.* V. *Nokia Corporation et al.*, Joint Supplemental Claim Construction of U.S. Pat. No. 8,380,244, Civil Action No. 13-010-RGA (Feb. 20, 2015).
*Interdigital Communications, Inc. et al.* V. *Nokia Corporation et al.*, Answering Brief of Microsoft Mobile Oy in Repsonse to Plaintiffs' Motion to Add It, and Opening Brief in Support of Cross-Motion to Substitute Parties Under Fed. R. Civ. 25 or Alternatively to Dismiss Nokia Corp. as a Named Party on Counterclaims, C.A. No. 13-010 (RGA) (Jul. 22, 2014).
*Interdigital Communications, Inc. et al.* V. *Nokia Corporation et al.*, Order, C.A. No. 13-10-RGA (Sep. 19, 2014).
*Interdigital Communications, Inc. et al.*, V. *ZTE Corporation et al., and Interdigital Communications, Inc. et al.* V. *Nokia Corporation et al.*, Transcript of Markman Hearing, No. 13-00009 and No. 13-00010 (Mar. 4, 2015).
Interdigital, Infringement Contentions as to U.S. Pat. No. 8,380,244, Exhibit 116 to Motion to Amend the Complaint in the 337-TA-868 Investigation, Corrected Exhibit 1023 in IPR 2014-00525 (May 19, 2014).
Interdigital, Infringement Contentions as to U.S. Pat. No. 8,380,244, Exhibit 114 to Motion to Amend the Complaint in the 337-TA-868 Investigation, Corrected Exhibit 1032 in IPR 2015-000745 (Oct. 16, 2014).
Interdigital, Letter to the Honorable Richard G. Andrews, pp. 1-25 (Sep. 5, 2014).
Interdigital, Letter to the Honorable Richard G. Andrews, pp. 1-40 (Sep. 2, 2014).
*Interdigital Communications, Inc. et al.* v. *ZTE Corporation et al.*, Civil Action No. 1:13-Cv-00009-RGA and *Interdigital Communications, Inc. et al.* v. *Nokia Corporation et al.*, Civil Action No. 1:13-cv-00010-RGA, Claim Construction Order, pp. 1-3 (Apr. 29, 2014).
*Interdigital Communications, Inc. et al.* v. *Nokia Corporation et al.*, Civil Action No. 1:13-cv-00010- RGA, Claim Construction Order, pp. 1-3 (Mar. 13, 2015).
*Microsoft Corporation* V. *IPR Licensing Inc.*, Decision, Institution of Inter Partes Review and Grant of Motion for Joinder, Case IPR2015-00074 (Mar. 4, 2015).
*Microsoft Corporation* V. *IPR Licensing Inc.*, Order, Case IPR2015-00074 (Feb. 17, 2015).
*Microsoft Corporation* V. *IPR Licensing Inc.*, Patent Owner's Preliminary Response to Microsoft Corporation's Petition for Inter Partes Review of U.S. Pat. No. 8,380,244, Case IPR2015-00074 (Dec. 5, 2014).
*Microsoft Corporation* V. *IPR Licensing Inc.*, Patent Owner's Updated Exhibit List, Case IPR2015-00074 (Dec. 5, 2014).
*Microsoft Corporation* V. *IPR Licensing Inc.*, Petition for Inter Partes Review of U.S. Pat. No. 8,380,244 (Oct. 16, 2014).
*Microsoft Corporation* V. *IPR Licensing Inc.*, Petitioner Microsoft Corporation's Exhibit List (Oct. 16, 2014).
*Interdigital Communications, Inc. et al.* v. *United States International Trade Commission et al.*, U.S. Court of Appeals for the Federal Circuit, Appeals from the United States International Trade Commission in Investigation No. 337-TA-800, pp. 1-19 (Feb. 18, 2015).
*Microsoft Corporation* V. *IPR Licensing, Inc.*, Supplemental Declaration of Dr. Harry Bims in Support of the Petition for Inter Partes Review of U.S. Pat. No. 8,380,244, IPR2015-00074 (Oct. 16, 2014).
Microsoft Corporation, Agreement Regarding Pending Litigation (Apr. 28, 2014).
Microsoft, Press Release: Microsoft officially welcomes the Nokia Devices and Services business, pp. 1-4 (Apr. 25, 2014).
Microsoft, Product Listing: 4G LTE Surface 2, pp. 1-11 (Obtained Oct. 14, 2014).

*ZTE Corporation et al.*, V. *IPR Licensing, Inc.*, Petitioner's Hearing Demonstrative Exhibits, Patent Trial and Appeal Board Oral Hearing, IPR 2014-00525 (May 21, 2015).
The American Heritage Dictionary of the English Language, Definition of Maintain, Fourth Edition, p. 1055 (2000).
The American Heritage Dictionary, Definition of Select, Third Edition, p. 741 (2003).
Wollman, Microsoft intros an LTE version of the Surface 2, arrives tomorrow for $679, Engadget: 4G LTE Surface 2 Product Launch, pp. 1-4 (Mar. 17, 2014).
*ZTE Corporation et al.* V. *Interdigital Technology Corporation*, Corrected Petition for Inter Partes Review of U.S. Pat. No. 8,380,244, Case No. IPR2014-00525 (May 19, 2014).
*ZTE Corporation et al.* V. *Interdigital Technology Corporation*, Petition for InterPartes Review of U.S. Pat. No. 8,380,244, Case No. IPR2014-00525 (Mar. 21, 2014).
*ZTE Corporation et al.* V. *Interdigital Technology Corporation*, Record of Oral Hearing, Cases IPR2014-00525 and IPR2015-00074 (May 21, 2015).
*ZTE Corporation et al.* V. *IPR Licensing Inc.*, Declaration of Dr. Wayne E. Stark, Case IPR2014-00525 (Jan. 6, 2015).
*ZTE Corporation et al.* V. *IPR Licensing Inc.*, Second Corrected Petition for Inter Partes Review of U.S. Pat. No. 8,380,244, Case IPR2014-00525 (Aug. 6, 2014).
*ZTE Corporation et al.* V. *IPR Licensing Inc.*, Videotaped Deposition of Harry Bims, Ph. D., Case IPR2014-00525 (Dec. 19, 2014).
*ZTE Corporation et al.* V. *IPR Licensing, Inc.*, Final Written Decision, Case IPR2014-00525 (Sep. 14, 2015).
*ZTE Corporation et al.*, V. *Interdigital Technology Corporation*, Declaration of Dr. Harry Bims in Support of the Petition for Inter Partes Review of U.S. Pat. No. 8,380,244, Case IPR2014-00525 (Mar. 21, 2014).
*ZTE Corporation et al.*, V. *IPR Licensing, Inc.* Hearing Presentation by Patent Owner Ipr Licensing, Inc., Case IPR 2014-00525 (May 21, 2015).
*ZTE Corporation et al.*, V. *IPR Licensing, Inc.*, Decision Institution of Inter Partes Review, Case IPR2014-00525 (Sep. 17, 2014).
*Interdigital Communications, Inc. et al.*, V. *ZTE Corporation et al.*, Transcript of Markman Hearing, CA No. 13-09-RGA and No. 13-10-RGA (Jun. 23, 2014).
*ZTE Corporation et al.*, V. *IPR Licensing, Inc.*, Patent Owner's Preliminary Response to ZTE's Petition for InterPartes Review of U.S. Pat. No. 8,380,244, Case IPR2014-00525 (Jul. 2, 2014).
*ZTE Corporation et al.*, V. *IPR Licensing, Inc.*, Patent Owner's Response to Petition for InterPartes Review of U.S. Pat. No. 8,380,244, Case IPR2014-00525 (Jan. 6, 2015).
*ZTE Corporation et al.*, V. *IPR Licensing, Inc.*, Patent Owner's Third Updated Exhibit List, Case IPR2014-00525 (May 18, 2015).
*ZTE Corporation et al.*, V. *IPR Licensing, Inc.*, Petitioners' Reply to Patent Owner's Response, Case IPR2014-00525 (Apr. 7, 2015).
*ZTE Corporation et al.*, V. *IPR Licensing, Inc.*, Petitioners' Updated Exhibit List of May 18, 2015, Case IPR2014-00525 (May 18, 2015).
*ZTE Corporation et al.*, V. *IPR Licensing, Inc.*, Revised Hearing Presentation by Patent Owner IPR Licensing, Inc., Case IPR 2014-00525 (May 21, 2015).
*Interdigital Communications, Inc. et al.* v. *ZTE Corporation et al.*, Judgment, Civil Action No. 13-9-RGA (Oct. 29, 2014).
*ZTE Corporation et al.*, V. *IPR Licensing, Inc.*, Videotaped Deposition of Dr. Wayne E. Stark, No. IPR2014-00525 (Mar. 24, 2015).
*Interdigital Communications, Inc. et al.*, V. *ZTE Corporation et al.*, Transcript of Markman Hearing, CA No. 13-09-RGA and No. 13-10-RGA (Mar. 17, 2014).
*IPR Licensing, Inc.* v. *ZTE Corporation et al.*, Brief of Appellant, Appeal from the United States Patent and Trademark Office, Patent Trial and Appeal Board in Nos. IPR 2014-00525 and IPR2015-00074, pp. 1-117 (Apr. 29, 2016).
*ZTE Corporation et al.*, v. *IPR Licensing, Inc.*, Patent Owner's Notice of Appeal, United States Corut of Appeals for the Federal Circuit, Case IPR2014-00525, pp. 1-84 (Dec. 29, 2015).

\* cited by examiner

SUBSCRIBER UNIT FOR MANAGING DUAL WIRELESS COMMUNICATION LINKS

RELATED APPLICATIONS

This application is a continuation of U.S. application Ser. No. 13/753,149 filed Jan. 29, 2013; which is a continuation of U.S. application Ser. No. 12/615,098 filed Nov. 9, 2009; now U.S. Pat. No. 8,380,244 issued Feb. 19, 2013, which is a continuation of U.S. application Ser. No. 11/326,809 filed Jan. 6, 2006, now U.S. Pat. No. 7,616,970 issued Nov. 10, 2009. U.S. application Ser. No. 11/326,809, now U.S. Pat. No. 7,616,970 issued Nov. 10, 2009 is a continuation of U.S. application Ser. No. 10/358,082 filed Feb. 3, 2003, now U.S. Pat. No. 7,013,162 issued Mar. 14, 2006 and a continuation of U.S. application Ser. No. 10/341,528 filed Jan. 13, 2003, now U.S. Pat. No. 7,024,222 issued Apr. 4, 2006. U.S. application Ser. No. 10/358,082 filed Feb. 3, 2003, now U.S. Pat. No. 7,013,162 issued Mar. 14, 2006 and U.S. application Ser. No. 10/341,528 filed Jan. 13, 2003, now U.S. Pat. No. 7,024,222 issued Apr. 4, 2006, are both continuations of U.S. application Ser. No. 09/400,136 filed Sep. 21, 1999, now U.S. Pat. No. 6,526,034 issued Feb. 25, 2003. The entire teachings of the above applications are incorporated by reference herein.

BACKGROUND OF THE INVENTION

The widespread availability of personal computers at low cost has led to a situation where the general public increasingly demands access to the Internet and other computer networks. A similar demand exists for wireless communications in that the public increasingly demands that cellular telephones be available at low cost with ubiquitous coverage.

As a result of its familiarity with these two technologies, the general population now increasingly wishes to not only access computer networks, but to access such networks in wireless fashion as well. This is of particularly concern to users of portable computers, laptop computers, hand-held personal digital assistants (PDAs) and the like, who would prefer and indeed now expect to be able to access such networks with the same convenience they have grown accustomed to when using their cellular telephones.

Unfortunately, there still is no widely available satisfactory solution for providing low cost, broad geographical coverage, high speed access to the Internet and other networks using the existing wireless infrastructure which has been built at some expense to support cellular telephony. Indeed, at the present time, the users of wireless modems that operate with the existing cellular telephone network often experience a difficult time when trying to, for example, access the Internet to view web pages. The same frustration level is felt in any situation when attempting to perform other tasks that require the transfer of relatively large amounts of data between computers.

This is at least in part due to the architecture of cellular telephone networks, which were originally designed to support voice communications, as compared to the communications protocols in use for the Internet, which were originally optimized for wireline communication. In particular, the protocols used for connecting computers over wireline networks do not lend themselves well to efficient transmission over standard wireless connections.

For example, cellular networks were originally designed to deliver voice grade services, having an information bandwidth of approximately three kilohertz (kHz). While techniques exist for communicating data over such radio channels at the rate of 9600 kilobits per second (kbps), such low frequency channels do not lend themselves directly to transmitting data at rates of 28.8 kbps or even the 56.6 kbps that is now commonly available using inexpensive wireline modems. These rates are presently thought to be the minimum acceptable data rates for Internet access.

This situation is true for advanced digital wireless communication protocols as well, such as Code Division Multiple Access (CDMA). Even though such systems convert input voice information to digital signals, they too were designed to provide communication channels at voice grade bandwidth. As a result, they use communication channels that may exhibit a bit error rate (BER) as high as one in one thousand bits in multipath fading environments. While such a bit error rate is perfectly acceptable for the transmission or voice signals, it becomes cumbersome for most data transmission environments.

Unfortunately, in wireless environments, access to channels by multiple subscribers is expensive and there is competition for them. Whether the multiple access is provided by the traditional Frequency Division Multiple Access (FDMA) using analog modulation on a group of radio carriers, or by newer digital modulation schemes that sharing of a radio carrier using Time Division Multiple Access (TDMA) or Code Division Multiple Access (CDMA), the nature of the cellular radio spectrum is such that it is a medium that is expected to be shared. This is quite dissimilar to the traditional environment for data transmission, in which the wireline medium is relatively inexpensive to obtain, and is therefore not typically intended to be shared.

On the other hand, wireless local area networks (W-LANs) have been developed to allow communications between users over a relatively small range without the need for a physical connection, or alternatively, to allow communications between a wired LAN and wireless users. W-LANs typically have a much smaller range and higher data rates.

A newly accepted standard, IEEE 802.11, specifies a protocol for the media access control (MAC) and physical (PHY) layers of a wireless LAN. As with cellular systems, a W-LAN connection can be handed off from one area of coverage (a "basic service set" in IEEE 802.11 parlance) to the next. A good description of wireless LANs, and the IEEE 802.11 standard in particular, may be found in Geier, J., Wireless LANs (Macmillan Technical Publishing, 1999).

SUMMARY OF THE INVENTION

Wireless LANs are generally private networks, that is they are installed, owned, and maintained by a private party, such as a business, educational institution or home owner. Such networks are therefore generally cheaper to access than long range networks which utilize shared public access frequencies licensed by a government authority to complete a connection, and which generally require subscriber fees.

In addition, W-LANs typically operate at a much faster data rate than the long range network. However, as the word "local" implies, the range of a W-LAN is rather limited—typically tens or hundreds of feet, as compared to several miles for a long range cellular telephone network.

It would therefore be desirable to have a device which can automatically select the cheaper and faster W-LAN when possible, e.g., when within its range, and to resort to the long range cellular network when access to the W-LAN is not possible or practical. Previously, two devices would have been required, one for accessing the WLAN and one for accessing the long range network. At best, these two devices could fit into two slots in, for example, a laptop computer, requiring the user to select, either through software or hardware, which device, and hence, which network to access. The user might typically then have to disconnect one of the devices to install the other, and manually reconfigure the computer.

The present invention, on the other hand, is a single device which connects directly to a W-LAN using a protocol such as IEEE 802.11 when such a connection is possible, and automatically reverts to connecting to the long range network only when out of range of the W-LAN base stations.

Thus, the same equipment can be used without any reconfiguration and even without the knowledge of the user. For example, when the user is on a company campus and within range of the less expensive, faster W-LAN, the user's laptop or PDA automatically communicates with the W-LAN. If the user leaves the office, for example, for lunch, or at the end of the day, heads home, the same laptop or PDA, being out of range of the W-LAN, will automatically communicate instead with the wider range, more expensive cellular network.

Therefore, the present invention is also a method which uses a first wireless digital communication path and a second wireless digital communication path for coupling data communication signals with a local wireless transceiver at a first site. The second digital communication path provides wider coverage and a slower communication rate than the first digital communication path. The local wireless transceiver conducts wireless communications with a remote wireless transceiver at a second site.

One of the wireless communication paths is selected upon a request to establish a communication session between the first and second sites by first determining whether the first wireless digital communication path is available.

In one embodiment, the first wireless communication path comprises a wireless LAN connection, preferably using carrier sense multiple access with collision avoidance (CSWCA), preferably according to the IEEE 802.11 specification. The second wireless communication path comprises a cellular connection. Access costs associated with the first wireless communication path are smaller than access costs associated with the second wireless communication path. Preferably, access to the first wireless communication path is essentially free, excluding expenses such as set-up and maintenance costs, while access to the second wireless communication path can be subscription-based.

The local wireless transceiver can be a single transceiver which is capable of communicating with a second site or destination over both wireless communication paths. Alternatively, the local wireless transceiver can comprise two transceivers, one for each communication path.

In one embodiment, the first wireless communication path is a private network. Conversely, the second wireless communication path can be a public network, in which channels are allocated centrally.

In one embodiment, the step of determining whether the first wireless communication mode is available is performed by passive scanning, such as by detecting a beacon signal. In another embodiment, active scanning is used, for example, by transmitting a probe request message and detecting a probe response message in response to the probe request which indicates the presence of the first wireless communication path. In yet another embodiment, determining whether the first wireless communication path is available comprises simply detecting activity on the first wireless communication path.

If the first wireless digital communication mode is available, a communication session between the first and second sites using the first wireless digital communication path is established.

On the other hand, if the first wireless digital communication path is not available, a communication session between the first and second sites using the second wireless digital communication path is established. In this case, the local wireless transceiver is controlled to make it appear to the second wireless digital communication path as though the bandwidth were continuously available during the communication session, irrespective of any actual need to transport data communication signals between said first and second sites. In the absence of such a need to transport data communication signals between the first and second sites, the bandwidth is made available for wireless communication by other wireless transceivers.

In one preferred embodiment, the second wireless digital communication path is provided by establishing a logical connection using a higher layer protocol, such as a network layer protocol, from a subscriber unit, such as may be connected to a portable computer node, to an intended peer node, such as another computer. The network layer logical connection is made through a wireless channel which provides a physical layer connection between the portable computer node, through a base station, and the intended peer node. In response to relatively low utilization of the wireless channel, the physical layer channel is released while maintaining the appearance of a network layer connection to the higher level protocols.

This has two consequences. First, it frees wireless channel bandwidth for use by other subscriber units, without the overhead associated with having to set up an end to end connection each time that data needs to be transferred. In addition, and perhaps more importantly, by allocating wireless channels only when needed, the bandwidth necessary to provide a temporary but very high speed connection is available at critical times. These may occur, for example, when a particular subscriber unit requests that a web page file be downloaded from the Internet.

More specifically, the technique, which is here called spoofing, involves stripping off the lower layers of the protocol while reformatting higher layer messages for transmission using a more efficient CDMA based encapsulated protocol.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
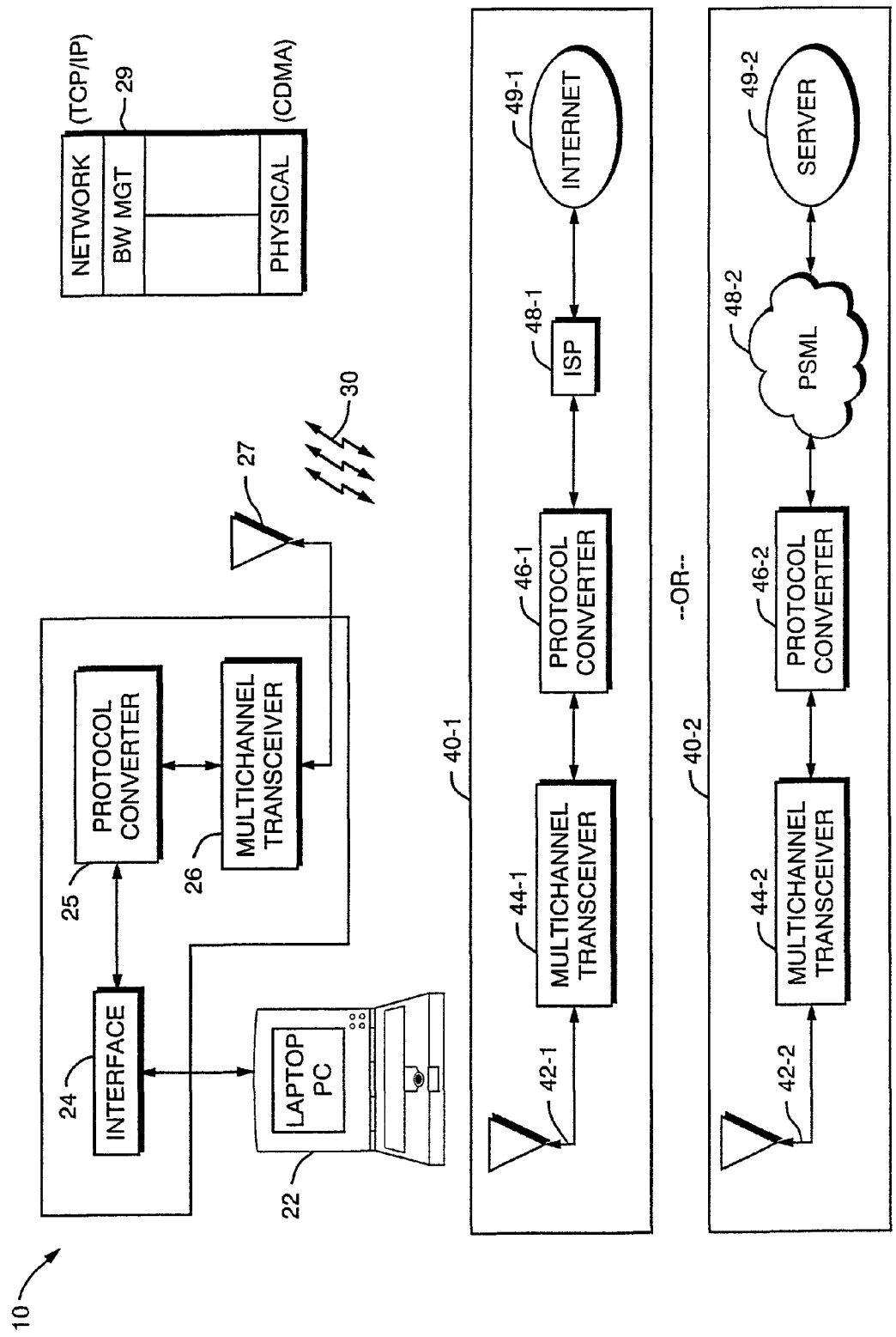
FIG. 1 is a block diagram of a system in which a portable device such as a laptop computer making use of a protocol converter according to the invention to connect to a computer network over a wireless cellular link.

Turning attention now to the drawings more particularly, FIG. 1 is a block diagram of a system 10 for implementing high speed data communication over a cellular link according to the invention. The system 10 consists of a remote or subscriber unit 20, multiple bi-directional communication links 30, and a local or service provider unit 40.

The subscriber unit 20 connects to terminal equipment 22 such as a portable or laptop computer, hand held Personal Digital Assistant (PDA) or the like, via a computer interface 24 such as a modem. The interface 24 in turn provides data to a protocol converter 25, which in turn provides data to a multichannel digital transceiver 26 and antenna 27.

The interface 24 receives data from the computer 20, and together with appropriate hardware and/or software, converts it to a format suitable for transmission such as in accordance with known communication standards. For example, the interface 24 may convert data signals from the terminal equipment 22 to a wireline physical layer protocol format such as specified by the Integrated Services Digital Network (ISDN) standard at rates of 128 kbps, or the Kflex standard at rates of 56.6 kbps. At a network layer, the data provided by the interface 24 is preferably formatted in a manner consistent with suitable network communication protocols such as TCP/IP to permit the terminal equipment 22 to connect to other computers over networks such as the Internet. This description of the interface 24 and protocols is exemplary only and it should be understood that other protocols can be used.

The protocol converter 25 implements an intermediate protocol layer suitable for converting the data provided by the interface 24 to a format appropriate for the multichannel transceiver 26 according to the invention, and as is described in greater detail below.

The multichannel digital transceiver 26 provides access to one or more physical communication links such as the illustrated radio channels 30. The physical links are preferably known wireless communication air interfaces using digital modulation techniques such as Code Division Multiple Access (CDMA) standard specified by IS-95. It should be understood that other wireless communication protocols and other types of links 30 may also be used to advantage with the invention.

The channels 30 represent one or more relatively slower communication channels, such as operating at a 9.6 kbps rate typical of voice grade communication. These communications channels may be provided by a single wide bandwidth CDMA carrier such as having a 1.25 MegaHertz bandwidth, and then providing the individual channels with unique orthogonal CDMA codes. Alternatively, the multiple channels 30 may be provided by single channel communication media such as provided by other wireless communication protocols. However, what is important is that the net effect multiple channels 30 represent multiple communication channels that may be adversely effected by significant bit error rates that are unique to each link 30.

An "error" as described herein is a bit error perceived at the higher layer such as the network layer. The invention only strives to improve the system level bit error rate, and does not attempt to guarantee absolute data integrity.

On the local provider unit, the service provider equipment 40 may for example be implemented at a wireless Internet Service Provider (ISP) 40-1. In this case, the equipment includes an antenna 42-1, a multichannel transceiver 44-1, a protocol converter 46-1, and other equipment 48-1 such as modems, interfaces, routers, and the like which are needed for the ISP to provide connections to the Internet 49-1.

At the ISP 40-1, the multichannel transceiver 44-1 provides functions analogous to the multichannel transceiver 26 of the subscriber unit, but in an inverse fashion. The same is true of the protocol converter 46-1, that is, it provides inverse functionality to the protocol converter 25 in the subscriber unit 20. The ISP 40-1 accepts data from the protocol converter 46-1 in the TCP/IP frame format and then communicates such data to the Internet 49-1. It should be understood that the configuration of the remaining ISP equipment 48-1 may take any number of forms such as a local area networks, multiple dial up connections, T1 carrier connection equipment, or other high speed communication links to the Internet 49-1.

Alternatively, the provider 40 may function as a radio base station in a cellular telephone system to permit a dial-up connection between the terminal equipment 22 and a server 49-2. In this instance, the base station 40-2 includes an antenna 42-2, multichannel transceiver 44-2, and protocol converter 46-2 providing one or more connections to a public switched telephone network (PSTN) 48-2, and ultimately to the server 49-2.

In addition to the illustrated implementations 40-1, 40-2, there may be various other ways of implementing the provider 40 in order to provide a connection to data processing equipment from the terminal equipment 22.

Attention is now turned to the functions of the protocol converters 25 and 46, which can be thought of as an intermediate layer within the context of the Open System Interconnect (OSI) model for communication. In particular, the protocol converter provides a bandwidth management functionality 29 implemented between a physical layer such as that provided by the CDMA protocol in use with the multichannel transceivers 26 and a network layer protocol such as TCP/IP providing connections between the terminal equipment 22 and the Internet 49-1 or server 49-2.

The bandwidth management functionality 29 preferably provides a number of functions in order to keep both the physical layer and network layer connections properly maintained over multiple communication links 30. For example, certain physical layer connections may expect to receive a continuous stream of synchronous data bits regardless of whether terminal equipment at either end actually has data to transmit. Such functions may also include rate adaption, bonding of multiple channels on the links, spoofing, radio channel setup and takedown.

The present invention is more particularly concerned with the technique used by the protocol converters 25 and 46 for adjusting the frame size of individual channels used over each of the multiple links 30 in order to improve the effective throughput rate between a sender and a receiver in a bit error rate prone environment. It should be understood in the following discussion that the connections discussed herein are bidirectional, and that a sender may either be the subscriber unit 22 or the provider unit 40.

Figure 2:
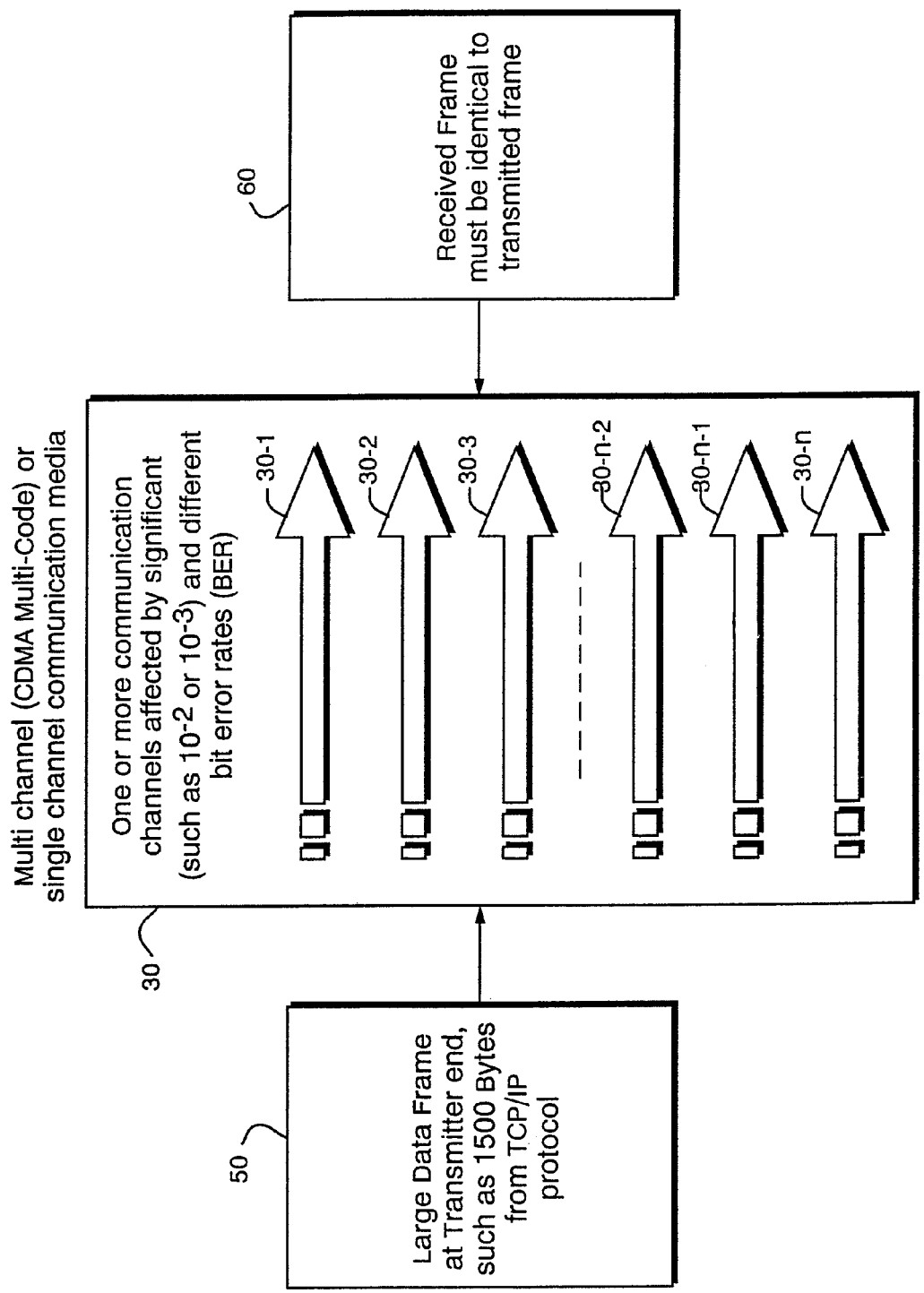
FIG. 2 is a diagram depicting how network layer data frames are divided among multiple physical links or channels.

More specifically, the problem addressed by the present invention is shown in FIG. 2. The frame 60 as received at the receiver end must be identical to the frame 50 originating at the sender. This is despite the fact that multiple channels are used with much higher bit error rates, with the received frame 60 being transmitted reliably with a bit error rate of $10^{-6}$ or better as is typically required in TCP/IP or other network layer protocols. The present invention optimizes the effective data throughput such that the received frames 60 are not affected by the experienced bit error rate performance of network layer connections.

It should be understood that another assumption is that the individual channels 30-1, 30-2 . . . 30-N may experience different bit error rate levels both over time and in an average sense. Although each of the channels 30 may operate quite similarly, given the statistical nature of errors, identical behavior of all of the channels 30 is not assumed. For example, a specific channel 30-3 may receive severe interference from another connection in a neighboring cell, and be capable of providing only a $10^{-3}$ bit error rate whereby other channels 30 may experience very little interference.

In order to optimize the throughput for the system 10 on a global basis, the invention also preferably optimizes the parameters of each channel 30 separately. Otherwise, a relatively good channel 30-1 might suffer down speed procedures required to accommodate a weaker channel 30-3.

It should also be understood that the number of channels 30 that may be needed to carry a single data stream such as a rate of 128 kbps at a given point in time may be relatively large. For example, up to 20 channels 30 may be assigned at a particular time in order to accommodate a desired data transfer rate. Therefore, the probability of significantly different characteristics in any given one of the channels 30 is high.

Figure 3:
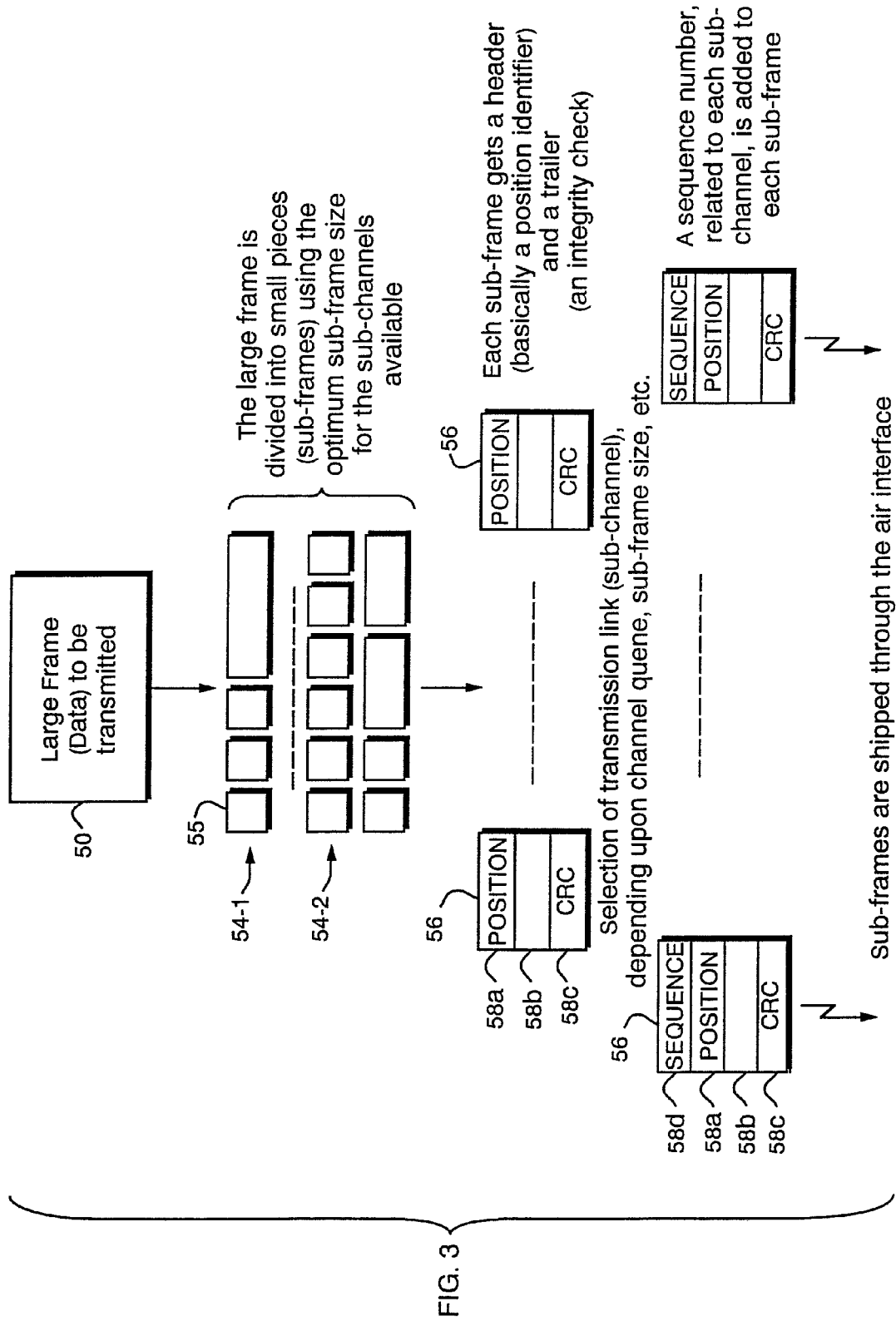
FIG. 3 is a more detailed diagram showing how network layer frames are divided into subframes by a protocol converter located at a sender.

Turning attention now more particularly to FIG. 3, the operations of the protocol converter 25 or 46 at the sender will be more particularly described. As shown, the input frame 50 as received from the network layer is relatively large, such as for example 1480 bits long, in the case of a TCP/IP frame.

The input frame 50 is first divided into a set of smaller pieces 54-1, 54-2. The size of the individual pieces 54 are chosen based upon the optimum subframe size for each of the channels 30 available. For example a bandwidth management function may make only a certain number of channels 30 available at any time. A subset of the available channels 30 is selected, and then the optimum number of bits for each subframe intended to be transmitted over respective one of the channels, is then chosen.

Thus, as illustrated in the figure, a given frame 54-1 may be divided into pieces associated with four channels. At a later time, there may be nine channels 30 available for a frame, with different optimum subframe sizes for the piece 54-2.

Each of the subframes 56 consists of a position identifier 58*a*, a data portion 58*b*, and a trailer typically in the form of an integrity checksum such as a cyclic redundancy check (CRC) 58*c*. The position identifier 58*a* for each subframe indicates the position within the associated larger frame 50.

The subframes 56 are then further prepared for transmission on each channel 30. This may be done by adding a sequence number related to each channel at the beginning of each subframe 56. The subframe 56 is then transmitted over the associated channel 30.

Figure 4:
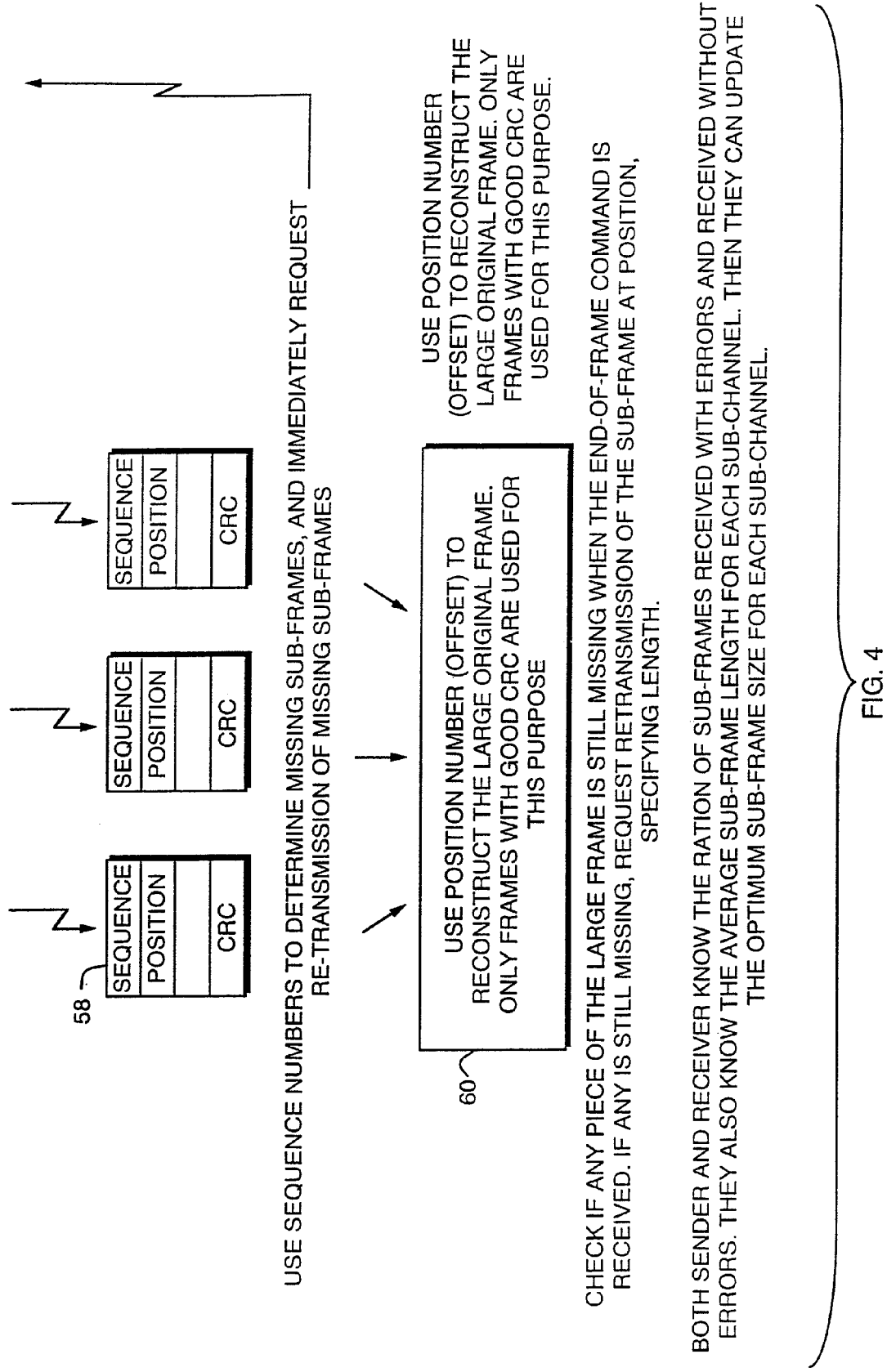
FIG. 4 is a continuation of the diagram of FIG. 3.

FIG. 4 illustrates the operations performed at the receive side. The subframes 56 are first received on the individual channels 30. A subframe 56 is discarded as received if the CRC portion 58*c* is not correct.

The sequence numbers 58*d* of the remaining frames 56 are then stripped off and used to determine whether any subframes 56 are missing. Missing subframes 56 can be detected by comparing the received sequence numbers 58*d*. If a sequence number is missing, it is assumed that the associated subframe 56 was not received properly. It should be understood that appropriate buffering of data and subframes 56 is typically required in order to properly receive the subframes 56 and determine if there are any missing sequence numbers depending upon the transmission rates, number of channels 30 and propagation delays in effect.

Upon the detection of a missing subframe 56, retransmission of the missed subframe is requested by the receiving end. At this point, the transmitting end reperforms transmission of the missing subframe.

Once all of the subframes 56 are received, the position number 58*a* is used to arrange the data from the subframes 56 in the proper order to construct the output received frame 60.

At this point, also, if any piece of the large output frame 60 is still missing, such as when an end of frame command is encountered, retransmission of the corresponding subframe can also be requested at the indicated position, specifying a length for the missing piece.

Because of the use of both the position and sequence numbers, the sender and receiver know the ratio of the number of subframes received with errors to the number of frames received without errors. Also, the receiver and sender know the average subframe length for each channel. The optimum subframe size can thus be determined for each channel from these parameters as is described more fully in U.S. Pat. No. 6,236,647 filed on Feb. 24, 1998, entitled "Dynamic Frame Size Adjustment and Selective Reject On a Multi-Link Channel to Improve Effective Throughput and Bit Error Rate," incorporated herein by reference in its entirety, and assigned to Tantivy Communications Corp., the assignee of the present application.

Figure 5:
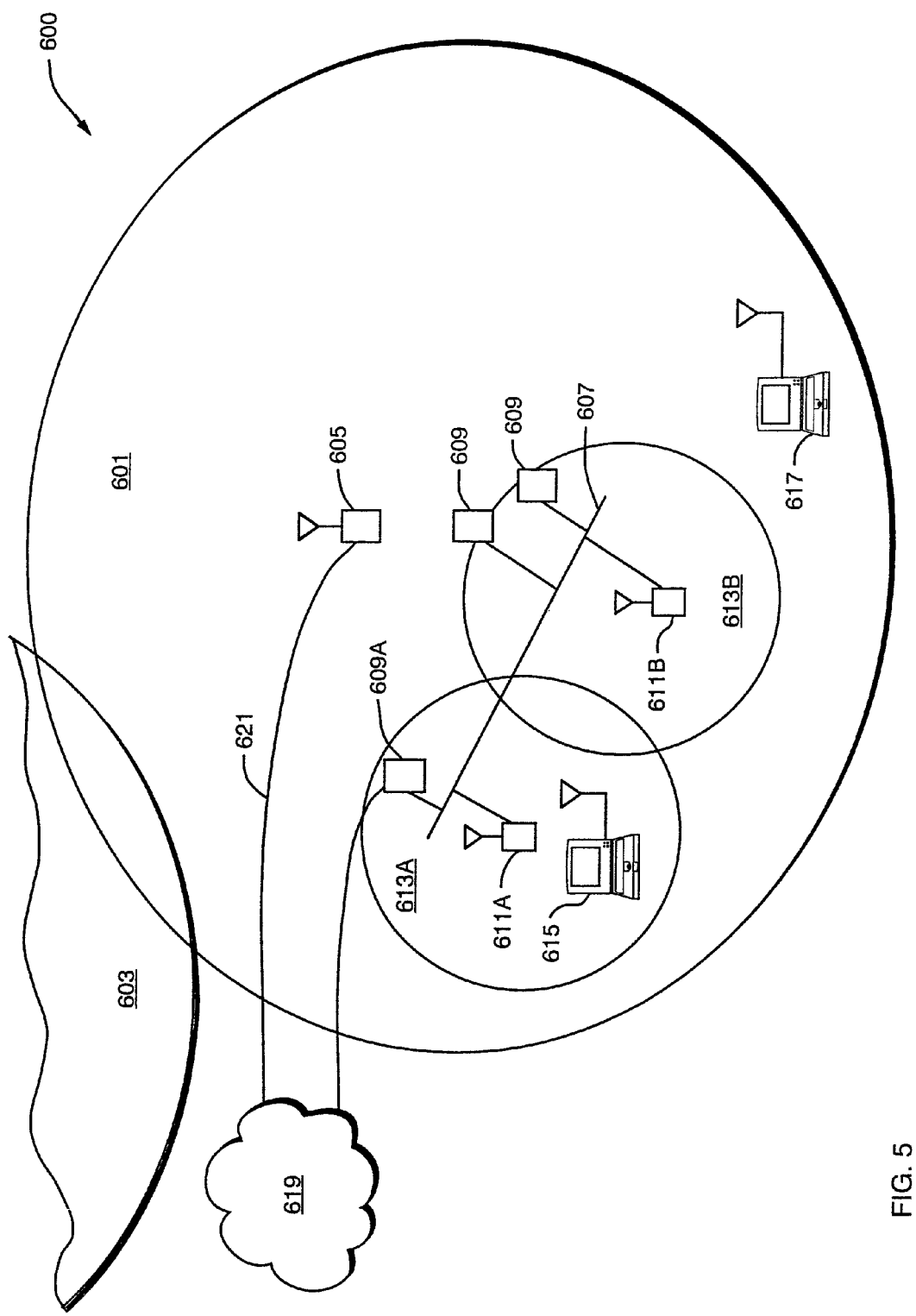
FIG. 5 is a schematic diagram of a short range, high speed wireless LAN overlapping with a longer range, lower speed wireless communication network.

FIG. 5 illustrates a short range, high speed wireless LAN (W-LAN) overlapping with a longer range, lower speed wireless cellular communication network ("long range network"). Specifically, within the longer range, lower speed system, which may be a digital cellular mobile telephone system, there are multiple long range regions or "cells" 601 and 603 which provide coverage throughout a given physical area. The range or coverage for each cell 601, 603 is on the order of, for example, greater than one mile radius.

A cellular base station 605 transmits and receives data through its antenna 171 to mobile units located within its associated cell 601. The base station 605 is connected to a public network 619 such as the public switched telephone network (PSTN) or preferably a point of presence (POP) or other data connection 621 to the Internet.

Shown within the cell 601 associated with base station 605 is a wireless local area network (W-LAN) 607. Several terminals or computers 609 are connected directly to the W-LAN 607, including a gateway 609A which is also connected to the public network 619 via any well-known means 621. In addition, two wireless LAN hubs 611A, 611B are connected to the LAN 607. Each wireless LAN hub 611 has a region of coverage 613A, 613B; the coverage area of the two hubs 611A, 611B may overlap as shown in FIG. 5. The regions of coverage 613A, 613B are generally of the order of tens or hundreds of feet, which is significantly smaller than the cells 601, 603 associated with the long range network. In this respect, it is particularly important to note that FIG. 5 is not drawn to scale.

Also shown are two subscriber units or terminals, such as portable computers, employing the present invention. The first terminal 615 is within range 613A of a wireless LAN base station 611, while the second terminal 617 is outside the range of either wireless LAN base station 611A, 611B but within the range 601 of the long range network base station 605.

Because communication within the short range wireless LAN 613A or 613B is faster and less expensive as compared to the long range network, it is desirable to communicate using the short range path, i.e., the W-LAN protocol, rather than the more costly long range network, when a user's computer terminal 615 is within range of a WLAN base station 611, i.e., within the region of coverage 613A, 613B.

On the other hand, it is desirable that a terminal such as terminal 617, which is not within range of a wireless LAN base station 611, automatically communicate through the long range network's base station 605. Thus it is a primary feature of the present invention that a terminal such as 615 or 617 detects the presence or availability of a wireless LAN hub 611A or 611B, such as an IEEE 802.11-compliant W-LAN hub. This can be done in several ways. For example, IEEE 802.11 specifies that a beacon frame should be transmitted at regular intervals. A terminal 615, 617 can detect the beacon frame by waiting a minimum period of time equal to the beacon interval. See, for example, Geier, J., Wireless LANs, pages 137 and 149, (Macmillan Technical Publishing, 1999), incorporated herein by reference, which describes how a W-LAN beacon signal is formatted.

Alternatively, a terminal such as 615 may actively transmit a probe request frame. A wireless LAN base station 611 receiving such a probe request frame will respond with a probe response frame. Receipt of the probe response frame by the terminal 615 indicates accessibility of the wireless LAN, and the terminal 615 will use the wireless LAN and bypass the long range network.

If, on the other hand, no beacon is received within the specified time period or no probe response frame is returned from the base frame, as would be the case with terminal 617, the terminal assumes that the wireless LAN base stations 611 are not accessible and instead communicates with the long range base station 605 using the long range network protocol rather than IEEE 802.11 protocol.

Yet another alternative is simply to listen for activity on the wireless LAN 611. If no activity is heard, the terminal 615, 617 assumes that the LAN is not accessible, and uses the long range communication system.

Figure 6:
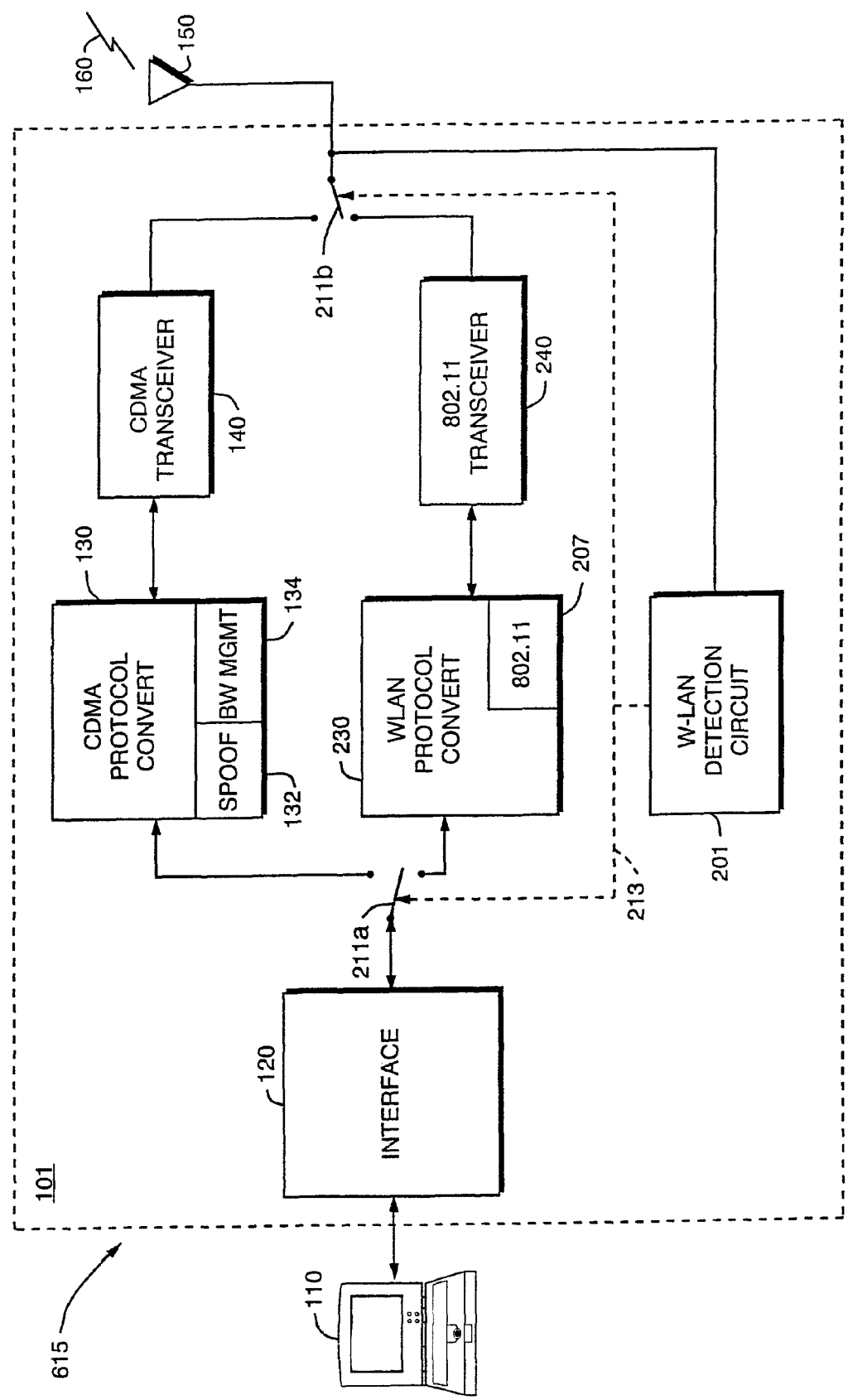
FIG. 6 is a high-level block diagram of a subscriber unit of the present invention.

FIG. 6 shows a terminal 615 which includes a subscriber unit 101 incorporating the features of the present invention. A user at this terminal 615 desires to communicate with a second site using a portable computer 110, PDA or other similar device. The computer 110 is connected to the subscriber unit 101. For example, the subscriber unit 101 may be a PCMCIA card which plugs into a PCMCIA slot, or it may connect to the computer 110 with a modem cable.

The subscriber unit 101 itself preferably consists of an interface 120, a CDMA protocol converter 130 that performs various functions including spoofing 132 and bandwidth management 134 as described earlier, a CDMA transceiver 140, a W-LAN protocol converter 230, a W-LAN transceiver 240, a W-LAN detection circuit 201, path selection switches 211A, 211B, and a subscriber unit antenna 150. The various components of the subscriber unit 101 may be realized in discrete devices or as an integrated unit. For example, an existing conventional computer interface 120 such as the PCMCIA, ISA bus, PC1 bus, or any other computer interface may be used together with existing transceivers 140, 240. In this case, the unique functions are provided entirely by the protocol converters 130, 230 which may be sold as separate devices, the W-LAN detection circuit 201 and the mode selection switches 211A, 211B.

Alternatively, the interface 120, protocol converters 130, 233, and transceivers 140, 240 may be integrated as a complete unit and sold as a single subscriber unit device 101. Other types of interface connections such as Ethernet, ISDN, or still other data connections may be used to connect the computing device 110 to the protocol converter 130.

The CDMA protocol converter 130 performs spoofing 132 and basic bandwidth management 134 functions. In general, spoofing 132 consists of insuring that the subscriber unit 101 appears, to the terminal equipment 110, to be connected to the public network 619 (FIG. 5) on the other side of the base station 605 at all times.

The bandwidth management function 134 is responsible for allocating and deallocating CDMA radio channels 160 as required. Bandwidth management 134 also includes the dynamic management of the bandwidth allocated to a given session by dynamically assigning sub-portions of the CDMA radio channels 160 in a manner using a protocol such as that described previously.

The CDMA transceiver 140 accepts the data from the protocol converter 130 and reformats this data in appropriate form for transmission through the subscriber unit antenna 150 over the radio link 160. The CDMA transceiver 140 may operate over only a single 1.25 MHz radio frequency channel or, alternatively, may be tunable over multiple allocatable radio frequency channels.

CDMA signal transmissions are then received and processed by the base station equipment 605 (FIG. 5). The base station 605 then couples the demodulated radio signals to, for example, the public network 619 in a manner which is well known in the art. For example, the base station 605 may communicate with the public network 619 over any number of different efficient communication protocols such as primary rate, ISDN, or other LAPD based protocols such as IS-634 or V5.2.

It should also be understood that data signals travel bidirectionally across the CDMA radio channels 160. In other words, data signals received from the public network 619 are coupled to the portable computer 110 in a forward link direction, and data signals originating at the portable computer 110 are coupled to the public network 619 in a so-called reverse link direction.

Continuing to refer to FIG. 6 briefly, in the long range, lower data rate mode, the spoofing function 132 involves having the CDMA transceiver 140 loop back synchronous data bits to spoof the terminal equipment 110 into believing that a sufficiently wide wireless communication link 160 is continuously available. However, wireless bandwidth is allocated only when there is actual data present from the terminal equipment to the CDMA transceiver 140. Therefore, the network layer need not allocate the assigned wireless bandwidth for the entirety of the communications session.

That is, when data is not being presented upon the terminal equipment to the network equipment, the bandwidth management function 134 deallocates initially assigned radio channel bandwidth 160 and makes it available for another transceiver and another subscriber unit 101.

W-LAN detection circuit 201 detects the presence or availability of a W-LAN base station 611 using, for example, one of the techniques previously discussed. If no W-LAN base station is detected, switches 211A and 211B are controlled by the detection circuit 201 such that the CDMA protocol converter 130 is switched in along with the CDMA transceiver 140.

If, on the other hand, a W-LAN is detected, switches 211A and 211B are switched to the position shown to utilize the W-LAN protocol converter 230 and transceiver 240, which are preferably IEEE 802.11-compliant. Note that the path switches 211A; 211B may be implemented in software or hardware, or a combination of hardware and software. Other functions may also be implemented in hardware and/or software which may further be shared by the W-LAN and CDMA sections where appropriate.

Furthermore, the long-range, low-speed CDMA path could be selected after failure to communicate over the short-range, high speed path for any reason, for example, the inability to successfully complete a communication after some predetermined time period.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A subscriber unit comprising:
  a processor configured to select a subset of a plurality of code division multiple access (CDMA) codes available to use for transmission of user data from the subscriber unit to a cellular network;
  a cellular transceiver configured to use the selected subset of the plurality of CDMA codes to transmit first user data from the subscriber unit to the cellular network; and
  an IEEE 802.11 transceiver,
  wherein the processor is further configured to maintain a communication session with the cellular network when the plurality of CDMA codes are not in use for the transmission of user data from the subscriber unit to the cellular network, and while the IEEE 802.11 transceiver transmits second user data to an IEEE 802.11 wireless local area network.

2. The subscriber unit of claim 1, wherein the first user data and the second user data are transmission control protocol and Internet protocol (TCP/IP) packet data.

3. The subscriber unit of claim 1, wherein the communication session is a transmission control protocol (TCP) layer session, an Internet protocol (IP) layer session, or a network layer session.

4. The subscriber unit of claim 1, further comprising:
  a detector configured to detect the IEEE 802.11 wireless local area network; and
  a circuit configured to select the IEEE 802.11 transceiver in response to the detector detecting the IEEE 802.11 wireless local area network.

5. The subscriber unit of claim 4, wherein the detector is configured to detect a beacon frame or a probe response frame received by the IEEE 802.11 transceiver from the IEEE 802.11 wireless local area network.

6. The subscriber unit of claim 1, wherein the selected subset of the plurality of CDMA codes comprises a first CDMA code having first transmission parameters and a second CDMA code having second transmission parameters, and wherein the first transmission parameters differ from the second transmission parameters.

7. The subscriber unit of claim 1, wherein the cellular transceiver is further configured to transmit the first user data to the cellular network via a sub-frame that includes a sequence number and a data portion.

8. The subscriber unit of claim 7, wherein the cellular transceiver is further configured to receive an indication of a missing sub-frame and to retransmit the missing sub-frame.

9. The subscriber unit of claim 7, wherein the sub-frame further includes an indication of a position of the sub-frame within a frame.

10. The subscriber unit of claim 1, wherein the second user data is communicated to the Internet via the IEEE 802.11 wireless local area network, and not via the cellular network.

11. The subscriber unit of claim 1, wherein the IEEE 802.11 transceiver is configured to connect automatically to the IEEE 802.11 wireless local area network when such a connection is possible.

12. The subscriber unit of claim 1, wherein the selected subset of the plurality of CDMA codes includes two or more CDMA codes.

13. The subscriber unit of claim 1, wherein the processor is further configured to select a the subset of the plurality of CDMA codes based on a size of the first user data.

14. The subscriber unit of claim 1, wherein the processor is further configured to select a the subset of the plurality of CDMA codes based on a desired data transfer rate.

15. The subscriber unit of claim 1, wherein the cellular transceiver is further configured to loop back synchronous data bits to the processor to enable the processor to maintain the communication session with the cellular network.

16. The subscriber unit of claim 1, wherein the plurality of CDMA codes available to use for transmission of first user data from the subscriber unit to a cellular network are orthogonal to each other.

17. The subscriber unit of claim 1, wherein the processor is further configured to select the subset of the plurality of CDMA codes based on a presence of the first user data.

18. A method for use in a subscriber unit, the method comprising the subscriber unit:
  selecting a subset of a plurality of code division multiple access (CDMA) codes available to use for transmission of user data from the subscriber unit to a cellular network;
  using the selected subset of the plurality of CDMA codes to transmit first user data to the cellular network; and
  maintaining a communication session with the cellular network when the plurality of CDMA codes are not in use for the transmission of user data from the subscriber unit to the cellular network, and while transmitting second user data to an IEEE 802.11 wireless local area network.

19. The method of claim 18, wherein the first user data and the second user data are transmission control protocol and Internet protocol (TCP/IP) packet data.

20. The method of claim 18, wherein the communication session is a transmission control protocol (TCP) layer session, an Internet protocol (IP) layer session, or a network layer session.

21. The method of claim 18, further comprising the subscriber unit:
  detecting the IEEE 802.11 wireless local area network; and
  selecting the IEEE 802.11 wireless local area network in response to detecting the IEEE 802.11 wireless local area network.

22. The method of claim 21, wherein detecting the IEEE 802.11 wireless local area network comprises receiving a beacon frame or a probe response frame from the IEEE 802.11 wireless local area network.

23. The method of claim 18, wherein the selected subset of the plurality of CDMA codes comprises a first CDMA code having first transmission parameters and a second CDMA code having second transmission parameters, wherein the first transmission parameters differ from the second transmission parameters.

24. The method of claim 18, further comprising the subscriber unit:
  transmitting the first user data to the cellular network via a sub-frame that includes a sequence number and a data portion.

25. The method of claim 24, further comprising the subscriber unit:
   receiving an indication of a missing sub-frame from the cellular network; and
   retransmitting the missing sub-frame.

26. The method of claim 24, wherein the sub-frame further includes an indication of a position of the sub-frame within a frame.

27. The method of claim 18, wherein the second user data is communicated to the Internet via the IEEE 802.11 wireless local area network, and not via the cellular network.

28. The method of claim 18, further comprising the subscriber unit:
   automatically connecting with the IEEE 802.11 wireless local area network when such a connection is possible.

29. The method of claim 18, wherein the selected subset of the plurality of CDMA codes includes two or more CDMA codes.

30. The method of claim 18, wherein the selecting a subset further comprises the subscriber unit:
   selecting the subset of the plurality of CDMA codes based on a size of the first user data.

31. The method of claim 18, wherein the selecting a subset further comprises the subscriber unit:
   selecting the subset of the plurality of CDMA codes based on a desired data transfer rate.

32. The method of claim 18, further comprising the subscriber unit:
   looping back synchronous data bits to the subscriber unit to enable the subscriber unit to maintain the communication session with the cellular network.

33. The method of claim 18, wherein the plurality of CDMA codes available to use for transmission of first user data from the subscriber unit to a cellular network are orthogonal to each other.

34. The method of claim 18, wherein the selecting the subset of the plurality of CDMA codes is based on a presence of the first user data.

\* \* \* \* \*